(12) United States Patent
Gardner

(10) Patent No.: US 7,177,728 B2
(45) Date of Patent: Feb. 13, 2007

(54) SYSTEM AND METHODS FOR MAINTAINING POWER USAGE WITHIN A SET ALLOCATION

(76) Inventor: Jay Warren Gardner, 9 Walker Rd., Unit 6, North Andover, MA (US) 01845-1957

( * ) Notice: Subject to any disclaimer, the term of this patent is extended or adjusted under 35 U.S.C. 154(b) by 119 days.

(21) Appl. No.: 11/025,302

(22) Filed: Dec. 29, 2004

(65) Prior Publication Data
US 2005/0143865 A1 Jun. 30, 2005

Related U.S. Application Data

(60) Provisional application No. 60/603,177, filed on Aug. 21, 2004, provisional application No. 60/556,541, filed on Mar. 26, 2004, provisional application No. 60/541,149, filed on Feb. 2, 2004, provisional application No. 60/533,428, filed on Dec. 30, 2003.

(51) Int. Cl.
G05D 11/00 (2006.01)

(52) U.S. Cl. .................................... 700/295

(58) Field of Classification Search ............. 700/286, 700/291, 295, 296
See application file for complete search history.

(56) References Cited

U.S. PATENT DOCUMENTS

| | | | | |
|---|---|---|---|---|
| 3,602,703 | A | * | 8/1971 | Polenz ..................... 700/291 |
| 4,471,232 | A | * | 9/1984 | Peddie et al. ............... 307/35 |
| 5,502,339 | A | * | 3/1996 | Hartig ........................ 307/31 |
| 5,964,879 | A | * | 10/1999 | Dunstan et al. ............ 713/340 |
| 6,891,478 | B2 | * | 5/2005 | Gardner ..................... 340/635 |
| 2005/0033707 | A1 | * | 2/2005 | Ehlers et al. ............... 705/412 |
| 2005/0125104 | A1 | * | 6/2005 | Wilson et al. .............. 700/295 |

* cited by examiner

*Primary Examiner*—Leo Picard
*Assistant Examiner*—Chad Rapp

(57) ABSTRACT

An electric power management system includes a monitor for the total power usage of a facility that monitors a history of power consumption during a set time interval of a distribution system having at least one electric load. Predictions of available power are generated through out the time interval by comparing the history of power consumption to a set allocation. Available power predictions are transmitted to the at least one electric load. The at least one load control receives the power capability predictions and controls the energy usage of the at least one electric load such that the total energy usage of the facility does not exceed the set allocation.

20 Claims, 18 Drawing Sheets

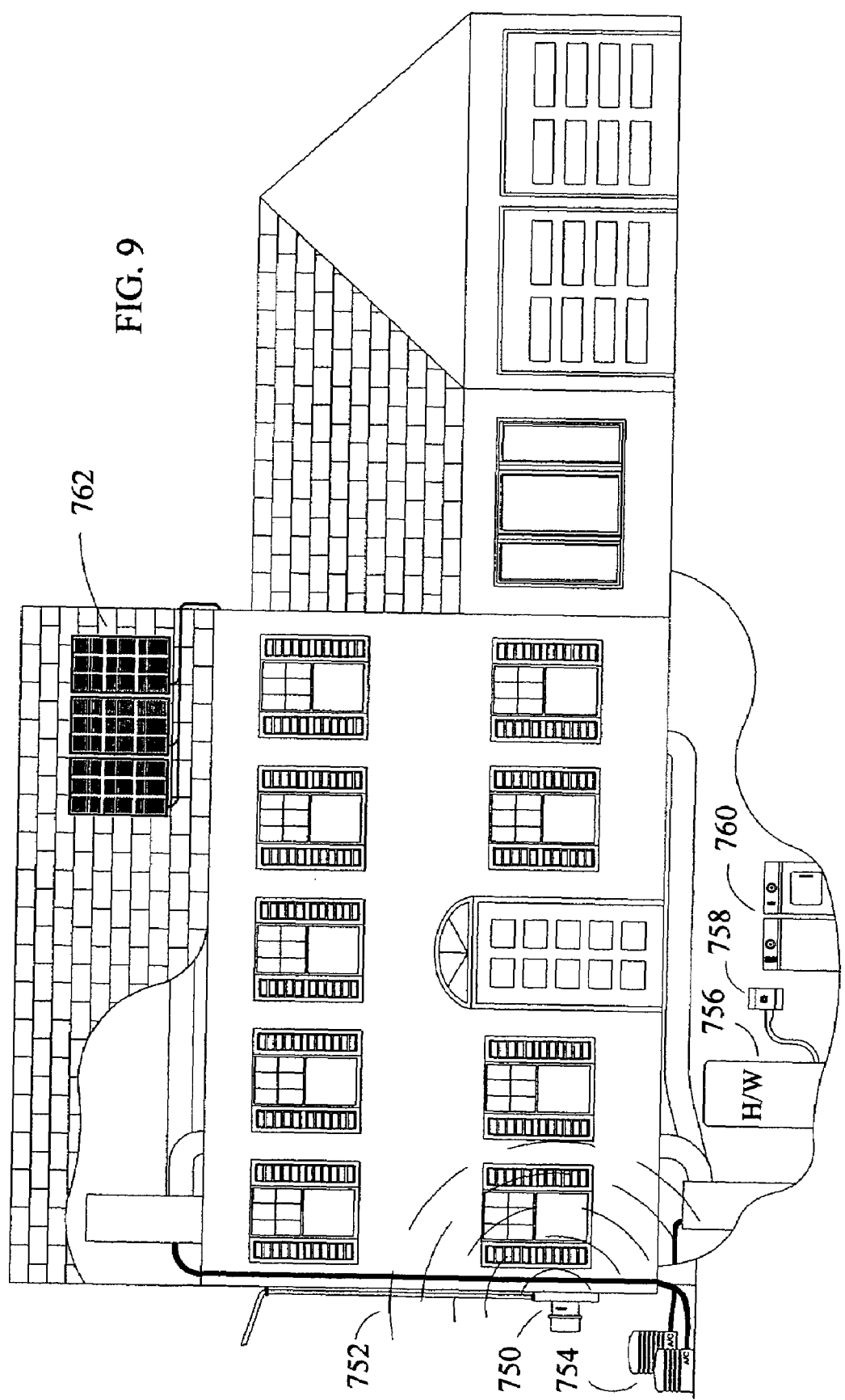

SYSTEM AND METHODS FOR MAINTAINING POWER USAGE WITHIN A SET ALLOCATION

RELATED APPLICATIONS

This application is related to U.S. Provisional Application No. 60/603,177, System and Methods for Maintaining Power Usage within a Set Allocation, Filed Aug. 21, 2004.

This application is related to U.S. Provisional Application No. 60/556,541, System and Methods for Maintaining Power Usage within a Set Allocation, Filed Mar. 26, 2004.

This application is related to U.S. Provisional Application No. 60/541,149, System and Methods for Maintaining Power Usage within a Set Allocation, Filed Feb. 2, 2004.

This application is related to U.S. Provisional Application No. 60/533,428, System and Methods for Maintaining Power Usage within a Set Allocation, Filed Dec. 30, 2003.

This application also applies to patent application Ser. No. 09/877,809 Methods and Apparatus for Controlling Electric Appliances During Reduced Power Conditions, filed Jun. 7, 2001, the contents of which are incorporated herein by reference.

BACKGROUND OF THE INVENTION

It is well known that the cost of providing electricity during peak demand can be many times that of the cost of providing electricity throughout the rest of the year. These peak times can be caused by power shortages due to unexpected power plant outages, cold weather where electric heat is prevalent, congested areas where local demand has outgrown transmission capability or most commonly on hot summer afternoons when air conditioning loads are highest. In the case of summer air conditioning loads, the peak demand averages less than 50 hours and very rarely exceeds 100 hours in any given year. For most of these conditions, electric supply is supplemented by local or distributed generating equipment. The cost of this distributed generating equipment becomes very high when applied to the very few peak hours of annual operation.

Many of the load management systems designed to reduce peak demand, are oriented on the fact that most electricity grids are not designed to store electricity. Electricity must be generated when needed and used when generated. As a result most electricity management is focused on the current or momentary condition of the overall system. This perspective has lead to many reactive load management systems that simply seek to shed loads when demand is critically high. The execution of such a system involves a complicated evaluation of the customer's preferences regarding which loads should be given power and which loads should be shed, under a variety of conditions. In addition, many of these load shedding systems have a central management system directing many load controlling devices needed to execute the many programmed preferences and schedules. In general, the more sophisticated systems require more components, which create incremental increases in cost.

There are several rotational duty cycle systems on the market that cycle loads on and off during times of high demand. One example is a timing switch installed in the power line of a central air conditioning compressor, which cycles power on and off at set periods, usually every 15 minutes. These duty cycles are often staggered such that only half of the duty cycle switches in a service area are on at a given time. Essentially half of the switches will allow air conditioning on the hour and at the half hour, with the other half of the switches allowing air conditioning at 15 and 45 minutes past the hour. These rotational duty cycle systems are successful in producing an overall effect but have their effectiveness limited by the loads with timers. Other loads in the home are uncontrolled allowing them to add to the peak demands. In addition, the system creates an inequity between customers with oversized central air conditioning systems and customers with properly sized central air conditioning systems. If a central air conditioning system is sized at 200% of the cooling load, then it normally runs just 50% of the time. Therefore, holding the run time to 50% will have zero effect on the electricity consumed. Conversely, the central air conditioning system sized at 100% of the cooling load will save considerable energy given the duty cycle switch will reduce the run time to half of what it would be in normal operation. The range of inequities across these systems will vary proportionally with the extent to which the air conditioning systems are oversized.

Lastly, energy management systems to date provide a limited level of control over facilities total energy usage. The major electrical loads are configured with control devices and the energy usage for just these loads is somehow managed in a way consistent with the operator's wishes. These systems reduce the facility load but do not pursue the goal of limiting total energy usage. The uncontrolled loads in the facility will create a random effect on the total energy usage.

SUMMARY OF THE INVENTION

The invention provides a methodology for proactively managing an amount of electricity, or allocation, over a predetermined period of time. The invention uses distributed decision making to control the energy consumption of one or more dominant loads in the facility. A power monitor measures the energy usage and transmits a usage status to device controllers supporting the dominant loads in the system. These device controllers determine how much electricity they can allow their loads and maintain usage at or below the allocation. These device controllers also transmit usage information between themselves to be used as an adjustment to the status information being transmitted by the power monitor. As uncontrolled background loads change during the use period, the power monitor updates its status transmissions to the device controllers. The device controllers keep the usage at or below the allocation by adjusting the allowed duration of their loads run cycle. Facilities select an allocation for future use periods and rely on the system to insure the allocation is not exceeded.

The invention provides an electricity generator, system operator or utility, the ability to activate a conservation mode whereby the system would set a lower allocation. It is acknowledged that ongoing efforts to deregulate the electricity industry may assign control of such conservation signals to any one of a number of entities. Therefore, the controlling entity will simply be referred to as the "Supplier", be it electric generator, system operator, transmission operator, utility, or any other entity that might receive the responsibility of controlling demand. During conservation mode, power monitors will initiate a methodology for managing a power allocation in subsequent use periods. If immediate demand reduction is required, the system could stop the dominant loads upon receiving the conservation mode activation, keep these loads stopped for the duration of the current use period and adhere to the conservation allocation upon the beginning of the next and subsequent use periods. The previous or higher allocation would be used once the need for the conservation mode ended.

The invention also provides a method of staggering and overlapping use periods among a multiplicity of customers for the purpose of preventing the aggregate effect of similar usage patterns, from creating abnormal highs and lows during the use period.

The invention provides the option of using a price schedule established by the electricity supplier. Customers can choose a price level for the purchase of electricity during a future contract period. If the price levels change with differing levels of use, the system can use these price levels for reporting the savings for maintaining usage below the allocation or the costs for overriding the allocation and using more power. The user can change the allocation dynamically if the user so chooses.

The invention provides a facility the ability to manage electricity from a limited and potentially variable source. Such a source would be an electric generating source with an electricity storage capability. An electric generating source would include any electric producing system including combustion engine powered generators, steam or hydro powered generators, fuel cells, or any number of systems utilizing renewable energy sources such as solar or wind power. When such a generator is coupled with any form of energy storage system, such as a battery, capacitor or flywheel, the energy available to its facility will vary depending on the state of charge in the energy storage system. In the case of renewable energy sources such as solar panels or wind turbines, factors such as solar intensity or wind speed will also have an effect on the size of the allocation. In this implementation of the invention, the allocation for any subsequent use period can be determined by the energy source and transmitted to the invention. The invention will then manage the dominant loads such that usage remains within the allocation for each use period as identified by the energy source.

The invention provides an electric power management system that manages a distribution of available power at an installation comprising a power source monitor that monitors an allocation of power of a power source over a time interval, the power source monitor predicting an available power at an installation over a remainder of the time interval in response to the power allocation and in response to a history of power consumption of the installation since a start of the time interval to generate an available power prediction for the installation for the remainder of the time interval; and at least one device controller that receives the available power prediction from the power source monitor to determine whether a sufficient power is available over a remainder of the time interval for operating a corresponding device for a run cycle of the device. The invention is applicable to residential and commercial facilities along with any other facility for which the run cycles of the dominant loads can be adjusted or managed. The processes of the invention cause the dominant loads to essentially compensate for the variations in energy usage caused by devices that are not controlled by the system. As uncontrolled devices use more electricity, the system reduces the energy usage allowed by the controlled loads, to compensate for the additional energy used by the uncontrolled loads, and thereby maintained energy usage at or below the intended allocation. Conversely, as uncontrolled devices use less electricity, the system increases the energy allowed by the controlled loads, to compensate for the additional energy used by the uncontrolled loads and thereby maintained energy usage at or below the intended allocation. By choosing the dominant loads in a facility to be the loads controlled by the invention, the relatively smaller changes in energy usage caused by the uncontrolled loads can be compensated for with relatively small changes in the run time of the dominant controlled loads.

The invention includes an electric power management system, wherein the power source monitor transmits the available power prediction to the at least one device controller. The invention allows for the available power prediction to be transmitted or communicated by the power monitor to the device controller or device controllers in the system. This communication between devices provides the invention with a level of distributed decision-making.

The invention includes an electric power management system wherein the power source monitor comprises multiple power source monitors, each of the multiple power source monitors having at least one corresponding device controller. This provides an additional level of control for the installer or customer. The power from a source can often be divided up, as with multiple circuits each delivering power from the source to parts of the facility or installation, potentially at varying voltage and amperage levels, for the purpose of addressing the needs of the installation. In these cases, the total energy usage is comprised of all the power delivered from the source, over these multiple circuits or delivery mechanisms. The invention includes the power source monitoring of these multiple power delivery circuits or mechanisms individually or in groups, with each of these power monitors having at least one corresponding device controller. This use of multiple power source monitors provides the installer with an additional level of control given the energy usage of different groups of devices can be managed separately.

The invention includes an electric power management system wherein the power source monitor predicts the available power at the installation over the remainder of the time interval by comparing the history of power consumption of the installation since the start of the time interval and the allocation of the available power over the time interval. This system provides for the process of generating the prediction of available power and the allocation of the available power to a device, in part or in whole, to be determined by the power source monitor.

The invention includes an electric power management system wherein the device controller stores electric load characteristics of the corresponding device. Any device will have load characteristics with regard to start up surge and continuous loads. The invention uses the load characteristics of each device controlled by a device controller to determine the duration of an allowable run cycle based on the prediction of available power. In many applications it will be preferable for the device controller to store the load characteristics of its corresponding device.

The invention includes an electric power management system wherein the device controller receives the electric load characteristics by monitoring a power line that supplies the corresponding device. For applications where the device controller has direct access to the power line supplying power to the device, the device controller can monitor the load characteristics directly and store the information for use in executing the processes of the device controller.

The invention includes an electric power management system wherein the device controller receives the electric load characteristics from one of an installer or manufacturer of the device. This is for applications where it is preferable for the device controller to be given the load characteristics of its supported load by either the manufacturer of the load and/or device controller, or by the installer installing the invention. This would also be for applications where the device controller did not have reasonable access to the power line supplying power to the device.

The invention includes an electric power management system wherein the device controller uses the electric load characteristics and the available power prediction to determine a duration of the run cycle of the corresponding device. This process uses the load characteristics of the device supported by the device controller to convert the available power prediction into a time period that is a duration of run cycle that for the supported device, will consume a portion of the available power prediction intended by the installer.

The invention includes an electric power management system wherein the at least one device controller comprises multiple device controllers, each device controller associated with a corresponding device. These are processes that provide distributed processing capability that enables a multiplicity of device controllers to utilize the predictions of available power such that each device uses a percentage of power that is in accordance with the intention of the installer.

The invention includes an electric power management system wherein each device controller of the multiple device controllers determines whether a sufficient power is available for operating the corresponding device for a run cycle of the device. This allows the device controller to compare the duration of the run cycle, that is derived from the prediction of available power, to a reference duration specific to the device, whereby the reference duration is determined to be a minimum duration appropriate for the device.

The invention includes an electric power management system wherein the at least one device controller operates the run cycle of the corresponding device using a thermostat. This application provides the integration of the device controller with a thermostat for the control of heating systems, heat pumps and air conditioning units, when these represent the dominant loads in the installation. This application also provides a familiar interface for the user. When users sense a change in temperature, they commonly check the thermostat. With some or all of the processes of the device controller being executed using a thermostat, the thermostat can be used to inform the user of system status along with the normal thermostat functions, such as the set and actual temperatures.

The invention includes an electric power management system further comprising a meter that provides the history of power consumption of the installation to the power source monitor. Many electric meters provide periodic meter readings, which report the electricity consumed. Some meters also report the time at which the meter reading was taken. The invention therefore includes applications where a power monitor uses periodic meter readings from a commonly available meter, to derive the history of power consumption relative to the use period or time interval, necessary to produce a prediction of available power over the remainder of the time interval.

The invention includes a method of managing a distribution of available electric power at an installation comprising: monitoring an allocation of electric power of a power source over a time interval; predicting an available power at the installation over a remainder of the time interval in response to the electric power allocation and in response to a history of power consumption of the installation since a start of the time interval to generate an available power prediction for the installation for the remainder of the time interval; and determining whether sufficient power is available over a remainder of the time interval for operating a device for a run cycle of the device based on the available power prediction. These methods can be integrated into other systems for the purpose of maintaining energy usage at or below a set allocation. These methods can also be integrated into devices in a facility, such as integrating the power source monitoring methods into electric meters and device controller methods into the devices that create the facility's dominant loads.

The invention includes the method of managing the distribution of electric power, wherein predicting the available power at the installation over the remainder of the time interval comprises comparing the history of power consumption of the installation since the start of the time interval and the allocation of the available power over the time interval. These methods use the history of power consumption at any point in time during the use period in conjunction with a prediction, or forecast of how much of the allocation will be used from the current point in time to the end of the use period, to determine a prediction of available power that is allocated in part of in whole, to a device for the remainder of the use period.

The invention includes the method of managing the distribution of electric power comprising: monitoring a power line that supplies electric power to the device to receive electric load characteristics of the device; and storing the electric load characteristics of the device. For methods that are incorporated into devices that have the ability to monitor the power line that supplies their electric power, this capability can be used to determine the load characteristics, particularly the continuous and surge characteristics, of the device and store these load characteristics for use in executing the other processes of the invention that require such load characteristics.

The invention includes the method of managing the distribution of electric power further comprising determining a duration of the run cycle of the device based on the electric load characteristics and the available power prediction. These methods determine a duration of run cycle for the controlled device, that will consume all or part of the predictions of available power.

The invention includes the method of managing the distribution of electric power further comprising determining whether a sufficient power is available for operating multiple devices for corresponding run cycles of the devices. These are processes that provide distributed processing capability that enables the predictions of available power to be distributed such that devices use a percentage of power that is in accordance with the intention of the installer. These processes include the use of combinations of the sequencing of run cycles, the use of standard time intervals, percentages of available power predictions intended for each of the one or more controlled devices in the installation, and the prediction of power that will not be used by a controlled device and in turn can be used in conjunction with other predictions of available power.

The invention includes the method of managing the distribution of electric power, wherein the device comprises a heat pump or air conditioning unit. The invention maintains electric usage of a facility at or below a preset allocation, by controlling the energy usage of the dominant loads in an installation. Energy usage is maintained at or below the set allocation by limiting the duration of a run cycle of dominant loads in and installation, such that the set allocation is not exceeded. Heat pumps and/or air conditioning units are frequently the dominant loads in a residence or commercial facility and can often have the duration of their run cycles varied without any significantly adverse consequences to their systems or to the residence or facility they support. Therefore, the methods of the invention are particularly applicable to residential and commercial heat pump and air conditioning units.

The invention provides methods for the devices in the system to work in a calibration mode that utilizes the power measuring and transmission capabilities of the power monitor for measuring and communicating the loads of devices supported by the device controllers. These methods are also applicable to U.S. Utility patent application Ser. No. 09/877, 809—"Methods and Apparatus for Controlling Electric Appliances During Reduced Power Conditions". The methods presented here for the power monitor and device controller to measure the surge and continuous loads of the supported devices can also be used by the generator monitor and the interrupt switches in patent application Ser. No. 09/877,809. These methods provide an optional substitution for the process of having the device controller, or interrupt switch, measuring the surge and continuous loads directly. These methods will be useful when the preferred placement of the interrupt switch makes direct measurement of the device loads inconvenient or otherwise difficult. These methods will also be useful in applications where removing the load measuring capability in the interrupt switch, or device controller, results in a net cost savings for the system.

Also, while first writing the description of this invention the term user often occurred near or in the same sentence with the term usage. To aid in clarity, the terms customer and installer are frequently substituted for the term user. Therefore the terms customer, installer and user have essentially the same meaning in this writing.

BRIEF DESCRIPTIONS OF DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is drawing or a home in which an embodiment of the invention is installed.

FIGS. 11 thru 17 are load profiles providing graphical illustrations for an example of a preferred embodiment of the invention.

DETAILED DESCRIPTION OF THE INVENTION

Figure 1:
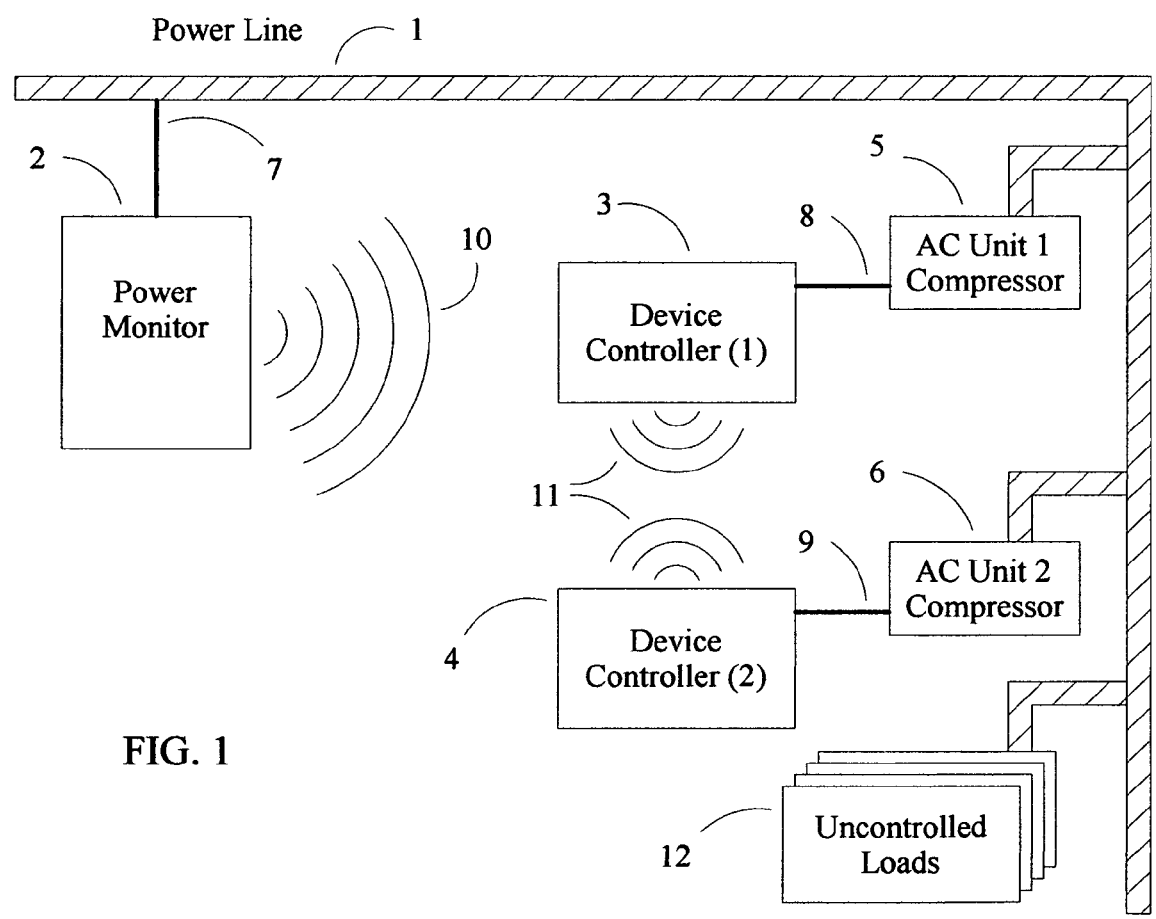
FIG. 1 is a block diagram in accordance with the present invention.

The invention uses a distributed decision process to proactively maintain electricity usage at or below an identified amount for a given time period. FIG. 1 is an example of a preferred embodiment of the invention where a power monitor, item 2, uses a history of power consumption by the total installation on the power line, item 1, and communicates, item 10, an available power prediction to the device controllers in the system, item 3 & 4. The device controllers determine a portion of the available power prediction that is intended for their devices, in this case air conditioning compressors, units 1 and 2, items 5 & 6 respectively and controls the duration of the run cycle via items 8 & 9, respectively for the supported device such that the device consumes the intended portion of the available power prediction. The electric usage of the uncontrolled loads, item 12 in the installation are accounted for in the history of power consumption and the determination of the available power prediction. The invention therefore contains the total usage of the installation by controlling the dominant loads, in this case air-conditioning compressors.

An example of a preferred embodiment of the invention is described with a series of load profiles (FIGS. 11 thru 17) that graph various processes of the invention as they pertain to the example. The load profile of FIG. 17 shows an energy usage profile for a full use period of the installation in the example. In this example the electricity usage of three devices, controlled by device controllers, have been managed in conjunction with the electricity usage of the uncontrolled loads, item 984, such that the allocation set for the installation, for the use period, is not exceeded. In FIG. 17 the set allocation is referenced as the dotted line, item 900, which is plotted as the allocation at constant load. The load profile of FIG. 17 drawn with the heavy line, item 986, shows the total energy used by the installation, comprised of the energy used by uncontrolled loads (item 984), and the energy used by the three controlled units, Run Cycle Unit I, Unit II and Unit III, items 981, 982 and 983 respectively. The invention has controlled the duration of the run cycles for each or the Units I thru III, based on the history of power consumption and the predictions of available power throughout the use period, such that the total of the electric usage of the installation is equal to or less than the set allocation of energy.

Figure 2:
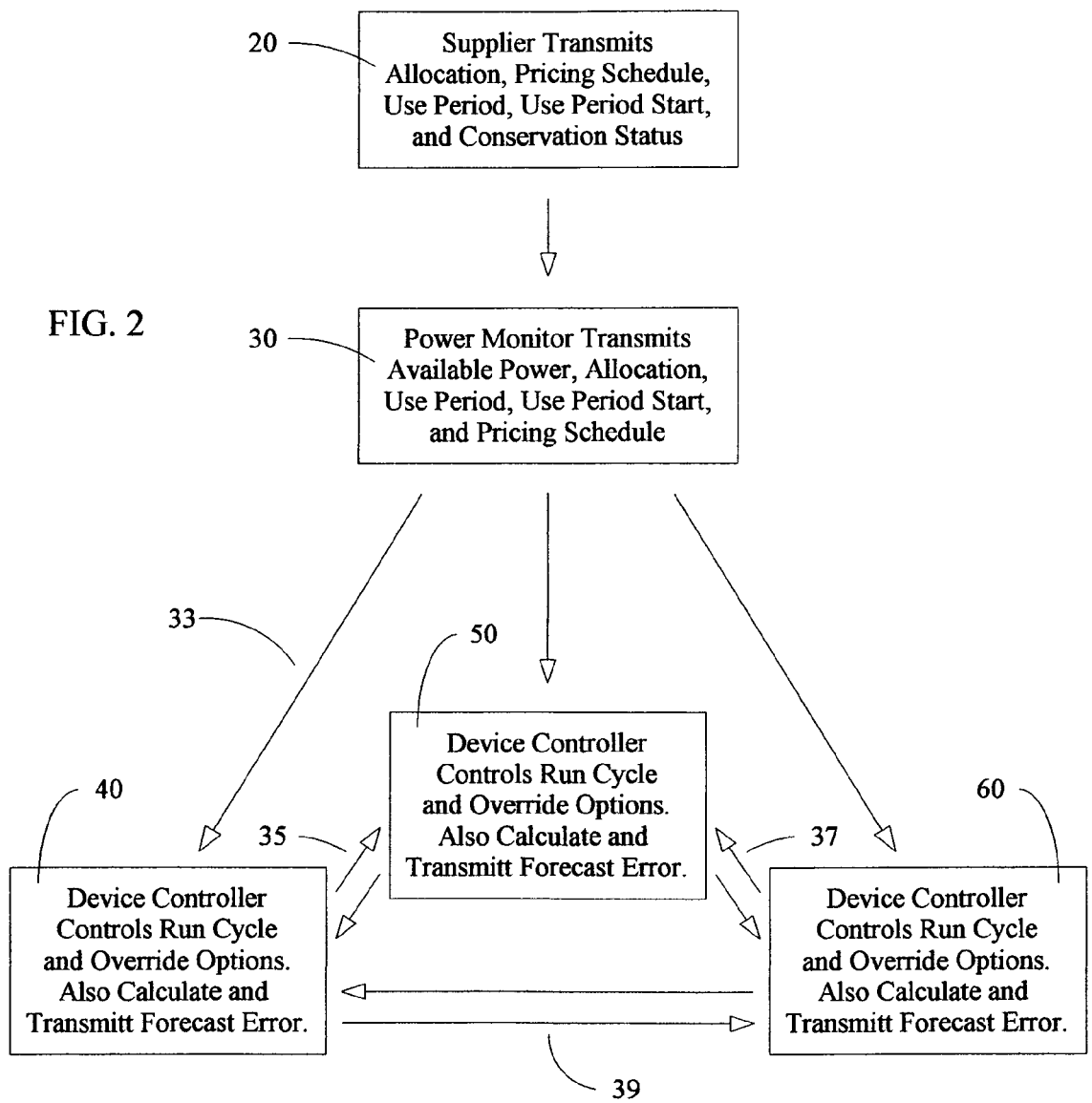
FIG. 2 is a system flow diagram, in accordance with the present invention.

The distributed decision processes simplify installation and provide a better division of accountability. The diagram in FIG. 2 shows the communication, coming from the supplier or power source 20, to the power monitor 30 and then to the device controllers 40, 50 and 60. Each device controller communicates available power predictions to the other device controllers in an installation. The distributed decision processes of the invention eliminate the need for complex load shedding schedules, common in other systems. The distributed processes also allow for clear lines of responsibility to be drawn between devices. A supplier can take responsibility for the processes in item 20 alone or in item 20 and 30, leaving the customer responsible for items 30, 40, 50 & 60 or just 40, 50 & 60 respectively.

The invention provides processes to keep the electricity usage within a specified amount for a given time period. Hereafter this amount of electricity will be referred to as the "allocation" and the given time period will be referred to as the "use period". The allocation could be any amount but most likely will be an amount of electricity that the customer considers sufficient or reasonable given the cost or capability of the source. The use period could be any fixed period of time, most likely one whose duration suits the nature of the devices being controlled and/or the preferences of both supplier and customer. The customer is allowed to use electricity at any consumption rate during the use period, provided the total electricity used during the use period does not exceed the allocation. FIG. 1 shows the direction of status transmissions between one power monitor and three device controllers. As will be shown later in this description, a power monitor can support any number of device controllers in a system. A system can also use more than one power monitor if the application intents to allocate portions of the supplied power to groups of loads supported by device controllers.

An embodiment of the invention that demonstrates the use of an allocation within a use period is a customer with a 2-kilowatt hour allocation in a one-hour use period. If the customer has a central air conditioning system that draws 3 kilowatts, the 2-kilowatt hour allocation would be fully used if the central air conditioning system runs 40 minutes or two thirds of every use period. The momentary draw during the 40 minute run cycle would be 3 kilowatts, however the customer would not exceed the allocation, given the 40 minute run cycle would only use 2 kilowatt hours in a one hour use period. The affects of other loads in the customer's facility have been ignored in this example for the purposes of simplicity. Methods for managing the effects of other loads will be explained later in this description.

The invention utilizes a power monitor, which executes distributed decision processes that participate in a proactive planning system that holds a facility's usage at or below a set allocation during a use period. The power monitor has an internal clock for tracking use periods. The power monitor tracks the cumulative electricity usage during each use period. The power monitor also calculates a forecast by assuming the total load L on circuits will continue for the duration of the use period. The power monitor predicts an amount of power that will be available at the end of the use period, referred to as available power. The available power prediction for any point in time during the use period is based on a history of power consumption since the start of the use period. The available power is calculated by subtracting the history of power consumption and a forecast usage allocation, from the full allocation for the use period. Available power prediction is updated frequently throughout the use period. A positive available power predicts the allocation will not be fully used by the end of the use period. An available power of zero predicts the allocation will be fully used by the end of the use period. A negative available power predicts usage will exceed the allocation at the end of the use period. The levels of available power, either positive, zero, or negative, will be communicated to one or more device controllers in the system.

A device controller is an intelligent device with a clock synchronized to the power monitor's clock. A device controller can optionally receive and store the electricity rates, which can be used to present customers with the cost of overriding the allocation. Each device controller supports one load. A device controller knows the surge and continuous loads applied by the device it supports. If a device controller is configured in the power line of the supported device, then the device load characteristics can be measured directly and stored in memory for use in the device controller's decision processes. If the device controller does not have access to the device's power line, then surge and continuous load characteristics can be input by the installer or by the manufacturer. If the loads cannot be easily measured via access to the power line and the surge and continuous loads are not known, then a calibration process can be used. The calibration process uses the electric load measuring capabilities of the power monitor to measure the load of the supported device and then transmit the surge and continuous load values to the supporting device controller. These values for surge and continuous load are then stored in the device controller's memory for use in future decision making. Once a device controller has the load characteristics of its device stored in memory, it is ready for normal operation. Each device controller detects the available power predictions from the power monitor. The device controller uses the available power information in conjunction with the surge and continuous loads of its device to determine the duration of a run cycle that ensures the facility does not exceed the allocation.

When the device controller receives an available power prediction from the power monitor and evaluates how long its device load can run on the available power. The device controller will then limit the duration of the devices run cycle accordingly. The device controller can initiate the run cycle towards the beginning of the use period, towards the end of the use period or any time during the use period. Installers will be able to direct device controllers to initiate their device run cycles at different points in the use period, thereby enhancing the level of system control.

When a device controller detects a change in available power, it will activate a process that can change the duration of its run cycle. This run cycle change is designed to compensate for other loads in the facility having turned on or off since the available power prediction on which the device controller calculated its run cycle duration. The device controller has an internal clock that tracks the time the run cycle started, the intended end of the run cycle, and how much of the run cycle time has elapsed. The device controller can determine how much time will remain in the use period after the run cycle ends and how much power will be removed from the power monitor's forecast. Recall that the power monitor's forecast assumes the total load L on circuits will continue for the duration of the use period. The power monitor's forecast does not account for the reduction in load caused by the device controller ending its run cycle prior to the end of the use period. The device controller however, can determine the amount of load reduction that should be applied to the available power prediction. Therefore if the negative available power from the power monitor is equal to the device controller's calculated load reduction, then the device controller does not need to make any adjustments in the duration of its run cycle. For system applications with more than one device controller, the device controllers can transmit their calculated load reductions to the other device controllers in the system, as their contribution to an error in the power monitor's forecast and/or correction to the predicted available power. If the device controller determines a total load reduction that is either larger or smaller than the negative value of available power, then the device controller adjusts the duration of its run cycle accordingly, to avoid an over usage or under usage of the use period allocation.

The invention allows the customer to increase the run cycle of the device supported by the device controller by turning off other devices in the home or facility. Turning off other loads will decrease the total load on circuits, increase the available power prediction and increase the run cycle of the device controller's device.

The device controller can also inform the user of the cost of purchasing additional electricity above the allocation, provided the source is capable of providing the additional electricity. The device controller has the ability to store the electric rates being charged to the customer, along with the customer's allocation. As noted previously the device controller also stores the value, or magnitude of the load for the device it supports. With this cost and load information, the device controller can calculate the cost of additional electricity, above the allocation, needed to run its supported load for extended run cycles. It is also within the scope of the invention for the decision processes to offer any associated reduction in rates, or credits for reduced usage, should the run cycles be shortened and the total usage be held at a level less than the chosen allocation.

The invention allows for multiple loads to be controlled with multiple device controllers. Supporting more than one device in a system provides the customer with an increased level of control over the facilities energy usage. For applications with multiple device controllers, it may become necessary to include a sequencing method within the distributed decision processes of the device controllers. In this case each device controller will be given a unique sequence number. Sequence numbers can be assigned in any order as long as each device controller is given a unique number. The invention will make use of a standard time interval, which will represent the overall response time of the system. The standard time interval will be long enough for the power monitor to detect a change in total load, calculate a new prediction of available power and use period remaining, transmit these values to the device controllers and allow the device controller to react with any changes to their run cycle and forecast error. When a device controller with a sequence number, detects a predicted available power, or calculates a corrected available power, that is sufficient to power a run cycle for its device, it will wait a unique time period before allowing the run cycle to initiate. This unique time period is equal to the standard time interval times the device controller's sequence number. By waiting a unique time period, a device controller is allowing each of the device controllers with higher priority, or numerically lower, sequence numbers to initiate a run cycle before initiating its run cycle. If a higher priority device controller initiates a run cycle after the conclusion of its wait period, the power monitor will have time to detect the increase in the total load L on circuits and transmit an updated available power prediction. All lower priority device controllers will then detect the new available power prediction, recalculate changes to their run time cycles and transmit updated forecast errors. With this process each device controller uses a distributed decision process to insure that each takes advantage of available power in sequence, and allows sufficient time for other device controllers to react to the resulting changes in available power.

The invention also provides methods for the device controllers to take a percentage of the available power, leaving the balance of available power for the loads supported by other device controllers. Once each device controller ends the run cycle for its device it will wait either until the end of the use period or for an extended wait period before starting the process of calculating and allowing another run cycle. This extended wait period will be several times the standard time interval to insure it is longer than all the other unique wait periods for the other device controllers in the system. This extended wait period will prevent a high priority device controller from starting a second run cycle ahead of the other device controllers, by way of its sequence number, and prevent the other device controllers from claiming their percentage of the available power.

The invention also provides for the device controllers to change the percentage of available power they use with time of day. This would allow the system to adapt to load shifting activities that shift the operation of certain loads to off peak hours or any preferable period during the day.

The invention also includes the percentage factors being changed by the customer to adjust for hourly, daily or seasonal changes in their preferences. In an embodiment of the invention, one example would be a home with a two-zone central air conditioning system. The air conditioning zone, which is more likely to be occupied during hot summer afternoons, might be given a higher, or numerically lower, sequence number, insuring it would get priority access to available power. The percentage factor assigned to the device controller supporting this priority zone would also be relatively high to match the customer's preferences. If the customer changes their preferences, the invention provides the ability for the customer to increase or decrease the percentage factor in corresponding zones, swap sequence numbers between zones, or both parameters for the purpose of adjusting the use of available power or cooling resources.

The invention also includes the adjustment of percentage factors and sequence numbers in accordance with a schedule that would react to outside temperature or climate conditions. As outside temperatures and humidity rise and fall, a customer's preference for energy use may change. On hot summer afternoons, a residential customer may choose to curtail the usage of pool pumps, clothes driers, hot water heaters, etc. During afternoons that are considered just moderately warm, the customer may want to curtail air conditioning for the purpose of freeing available power for the other devices in the home. Commercial customers may choose on hot afternoons to curtail lighting and turn off alternate copy machines in order to free up available power for air conditioning. For these and other customer objectives, the invention allows for the priority factors and sequence numbers to adjust in accordance with outside climate conditions.

The invention also provides methods for using the load measuring capabilities of the power monitor to measure the surge and continuous loads of a device and then transmitting the surge and continuous loads to the device controller for use in its decision process. These methods provide an alternate way for obtaining surge and continuous loads particularly when the device controller does not have direct access to the device's power line or when the values for surge and continuous loads are not readily available for direct input into the device controller. These methods can also be used as a way of checking, or calibrating, the surge and continuous loads between the power monitor and the device controller. These methods for measuring surge and continuous loads are also applicable to patent application Ser. No. 09/877,809 and similarly use the load measuring capabilities of the generator monitor to measure the surge and continuous loads of a device and then transmit the values to the respective interrupt switch.

The invention recognizes that similar implementations on similar facilities will create similar load patterns. Therefore in utility service areas where facilities are similar in configuration, similar implementations of the invention could cause very high and very low aggregate loads that align with the facility load patterns. For this and any other adverse aggregate effects, the invention provides for the ability to stagger the beginning of each system's use period, which will cause the high and low loads of the similar load patterns to overlap and result in a leveling effect on the aggregate load pattern.

Power Monitor

Figure 3:
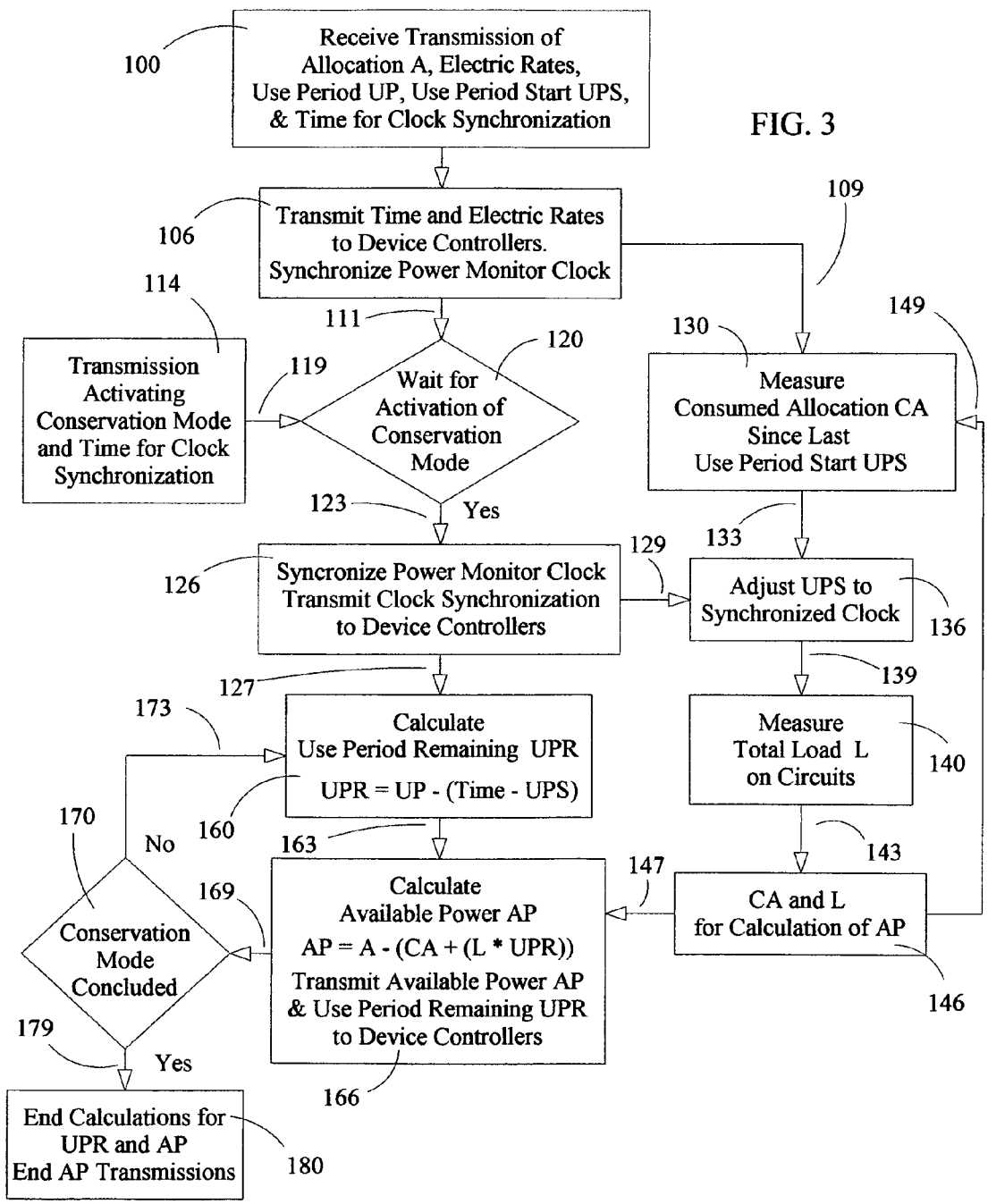
FIG. 3 is a flow diagram of the power monitor's process, in accordance with the present invention.

The power monitor process is described in FIG. 3. The process begins with the power monitor receiving or having values input for its operation 100. These values are the intended electric usage or allocation, the electric rates if applicable, the use period, the time of use period start and the correct time for the power monitor clock. The allocation will be the amount of electricity the customer does not want to exceed in any given use period. The use period is the time period in which one allocation can be used. The use period start is the time, or times in the hour that the use period will start. The setting of the use period start allows the supplier to stagger the use periods across their customer base. As noted previously, the loads controlled by the invention will create a relatively repetitive load pattern. By allowing the supplier to stagger the start of the use periods across its customer base, the supplier has the ability to stagger highs and lows of these repetitive load patterns to diminish the aggregate highs and lows applied to the grid infrastructure. Lastly a current time is loaded for the purpose of synchronizing the power monitor's clock with all the other clocks in the suppliers customer base, thereby insuring the intended effectiveness of staggering the use periods. The updating of these values and/or synchronizing of the clock should be done whenever values have been changed and whenever the accuracy of the inventions components would warrant.

The system may run continuously and always maintain usage within the allocation or may just run during times of high demand when conservation measures are needed. The system can be designed to activate whenever electric rates are high, which occur with any number of tiered or variable electric rates such as time of use, real time price, etc. By designing the system to activate whenever rates are high, the system would maintain usage below the allocation and limit the user's exposure to these higher energy rates. The system may also have allocation levels set for specific use periods that would control the usage for those use periods accordingly.

The system may incorporate multiple power monitors for managing multiple circuits and the one or more devices supported by each of these circuits with the intent of maintaining usage for each circuit or group of circuits within a set allocation. A facility could choose to manage circuits of different voltages with separate power monitors, such as one or more power monitors and allocations for 120-volt circuits and one or more power monitors and allocations for 220-volt circuits. A facility may have select circuits managed by the invention and leave others unmanaged depending on the customer's preferences. A facility could choose to curtail demand by using an onsite generator for powering some of the circuits in the facility while leaving other circuits on the supplier's power source. In this supplemental generator configuration, separate power monitors could be used to manage the circuits on the generator(s) and the circuits still powered by the supplier. In the case of a facility on a generating or renewable energy system, with electric storage capability, the allocation may be fixed or it may be a dynamic value that reflects the amount of electricity possible over the next use period, based on the combined generation capability and the state of charge in the energy storage system.

The power monitor's process continues in block 106 by synchronizing its clock and transmitting the correct time and the electric rates to the device controller or controllers in the system. The power monitor process then via 109 enters a loop that will measure and maintain a history of power consumption during the current use period. Process 106 also proceeds via 111 to 120, where the system will wait for a transmission from 114 to activate a conservation mode. When the supplier decides that demand must be controlled, it will transmit a signal to activate the conservation mode 114. This transmission 114 may also include the current time, which the power monitor will again use to synchronize its clock 120 via 123 to 126. The power monitor will also send the correct time to the device controller(s) for the purpose of synchronizing their clocks via 123, 126, 129 and 136. This second clock synchronization is intended to correct any timing errors in the event process block 120 waits for extended periods between conservation mode activations via 114.

From process block 126 the system enters two loops, which will determine predictions of available power. The first loop was started earlier from 106 via 109 to 130 when the system started tracking the power used during each use period. Process block 130 measures the consumed allocation CA, or the power consumed since the beginning of the current use period, or use period start UPS. The loop continues via 133 to process block 136 where a time for clock synchronization is received from the power monitor. This synchronization is intended to correct any drifts in time since the last time conservation mode was activated. The process continues via 139 to process block 140 where the facility's total load "L" is measured. The process continues via 143 to 146, which provides via 147, current values for consumed allocation CA and the total load L on circuits, to the other loop started by process block 126. This loop also continues via 149 to process block 130 where the loop will continue providing updated values of consumed allocation CA and total load L.

After sending clock synchronization to the device controllers in process block 126 the other of the two loops is started via 127 going to process block 160. In process block 160 the time remaining in the use period, or use period remaining UPR, is calculated. The current use period start UPS is subtracted from the current time and this difference is then subtracted from the use period, resulting in the use period remaining UPR.

The power monitor process continues via 163 to 166 where the predicted available power AP is calculated and transmitted to the device controller(s). For the calculation of available power AP, current values for consumed allocation CA and total load L are obtained from process block 146 via 147. In block 166 the expression (L*UPR) represents the usage forecast by which total load L will continue for the remainder of the use period or use period remaining UPR. This forecast is then added to the consumed allocation CA. The total of usage forecast plus consumed allocation represents the amount of power the power monitor predicts will be used at the end of the use period. This total is then subtracted from the allocation A to calculate the value of predicted available power AP. The values of predicted available power AP and use period remaining UPR are then communicated to the device controllers via any commonly known communication medium.

The graphs in FIGS. 11 thru 17 illustrate various points in time during one use period for an example of a preferred embodiment of the invention. The graphs in FIGS. 11 thru 17 plot measured load on the vertical, or y-axis, and one use period on the horizontal, or x-axis. Given the graphs in FIGS. 11 thru 17 plot load against time, any area on the graph represents an amount of power.

Figure 11:
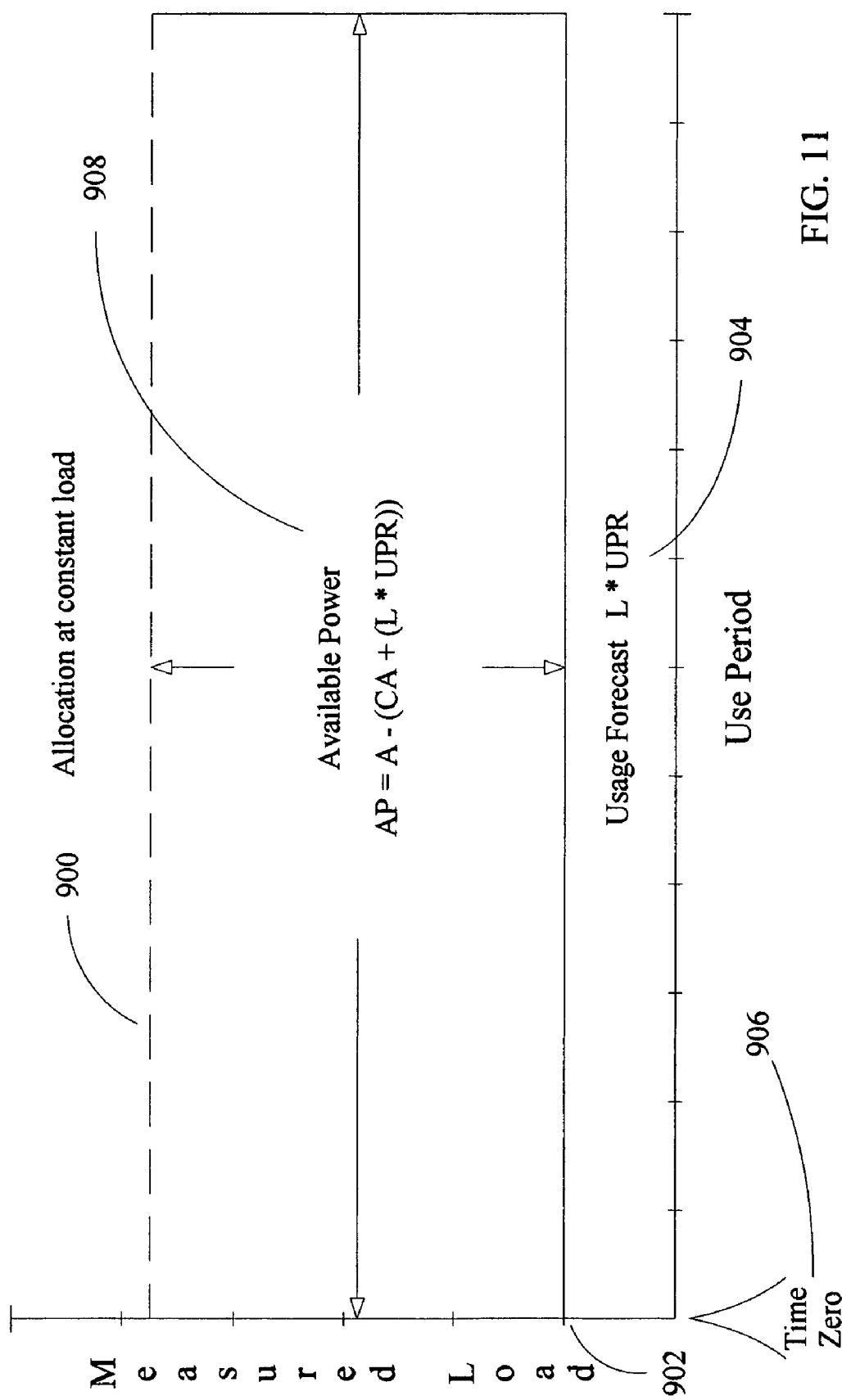

FIG. 11 illustrates the first available power prediction calculated by the power monitor at the very beginning of the use period, or time zero, item 906. Item 900 is a dotted line that shows the allocation A plotted as a constant load for the duration of the use period. The area towards the bottom of the graph, item 904, is the usage forecast L* UPR. This is the forecast component of the calculation in process block 166 of FIG. 3. This calculation, item 904, at time zero, has a use period remaining UPR that is equal to the full use period UP. At this time zero, the consumed allocation CA (see process block 130 of FIG. 3) is equal to zero, given no time has elapsed since use period start UPS. On FIG. 11, just above the usage forecast item 904, is item 908 which is the area representing the available power prediction AP. The equation calculating the available power prediction, item 908, is the equation of process block 166 in FIG. 3.

The power monitor process of FIG. 3 continues from 166 via 169 to decision block 170 which tests to see if the period for the conservation mode has concluded. As mentioned previously in this description, the conservation mode can be activated during periods of high demand or can be run continuously. If the conservation mode is activated during periods of high demand, it is anticipated that the period of high demand will end, at which time the system will cease to operate in the conservation mode. Embodiments of the invention might include a method where the supplier would activate conservation mode for a time period appropriate for the specific circumstance requiring conservation or for a predetermined period such as 11:00 am to 5:00 pm. Numerous methods of defining the beginning and end of the conservation period exist. Whatever the process for defining the duration of the conservation period, methods for determining the end of this period will be incorporated in decision block 170. If the invention is used to keep electric usage within the allocation on a continuous basis, making the conservation mode a perpetual condition, then process blocks 120, 114 and 126, and process blocks 170 and 180, can be effectively eliminated from the power monitor process thereby leaving process block 106 to lead directly to process block 160 and process block 166 to lead directly to process block 160 respectively. If the invention is used to keep electric usage within the allocation on a continuous basis and the noted process blocks eliminated, then the clock synchronization process should be retained. Clock synchronization can be the beginning of each use period or a periodic synchronization at an interval consistent with the accuracy of the power monitor and device controller clocks.

The invention recognizes that the calculation of use period remaining UPR can take place in either the power monitor, as it does in process block 160 of FIG. 3 or could take place in the processes of the device controller. For the purposes of simplicity in this description, the power monitor does the calculation once, transmits the value to the device controllers and avoids redundant calculations in the device controller flow diagrams. This description acknowledges that various design objectives, such as a reduction in the volume of data transmitted, could be achieved by having the device controller(s) perform the calculation for use period remaining UPR. The invention therefore includes such a modification within the scope of the invention.

Device Controller

Figure 4:
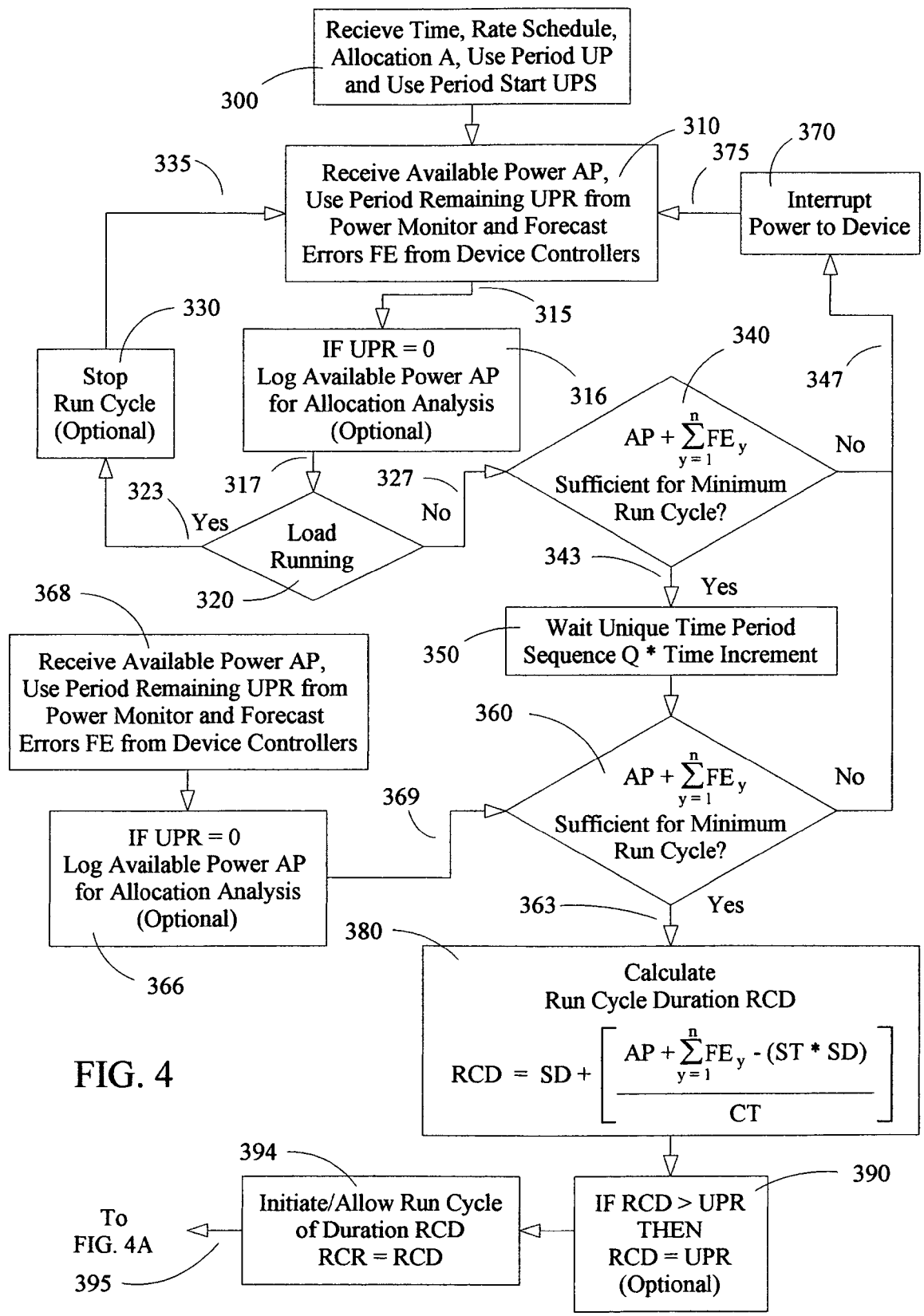
FIG. 4 is a flow diagram for part of a device controller's process that determines the supported device's run cycle duration, in accordance with the present invention.
Figure 4A:
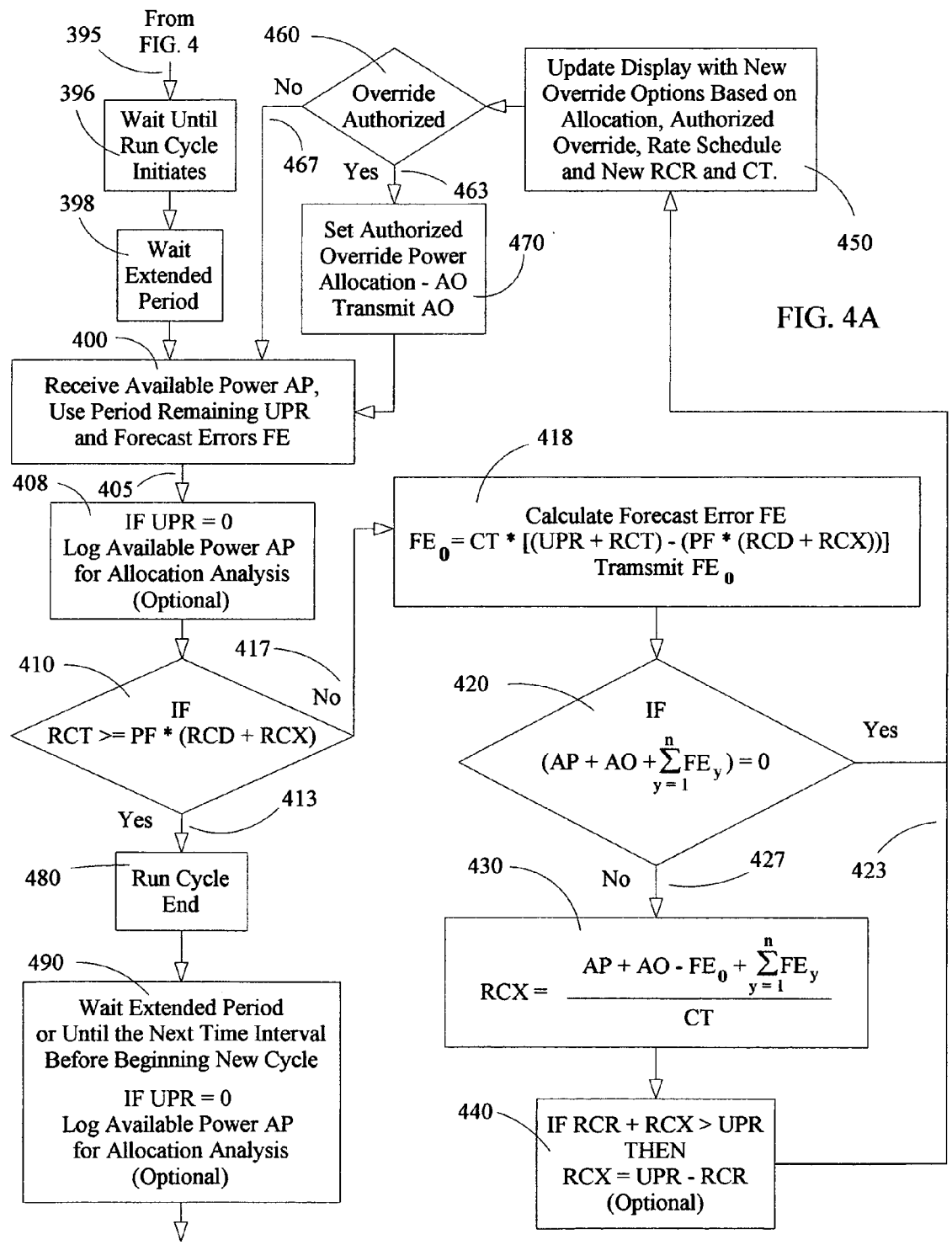
FIG. 4A is a continuation of the flow diagram of FIG. 4 showing the device controller process for evaluating subsequent transmissions of available power and adjusting the duration of the supported device's run cycle, in accordance with the present invention.

FIGS. 4 and 4A provide the processes for a device controller implementing a run cycle for its supported device towards the beginning of the use period. Process block 300 in FIG. 4 receives transmissions of current time, rate schedule if applicable; allocation A, use period UP and use period start UPS from the power monitor. The time will be used to synchronize the device controller's clock. The rate schedules will be used to calculate the cost of an allocation override, should the customer decide to use more electricity than the allocation allows. The allocation will be used to determine the price point in the rate schedule, if applicable, from which the cost of overrides will be based. This allows for one rate schedule with multiple rates and/or multiple allocation choices to be used with a multiplicity of customers. If the user does not want or need the system to present the cost of an override, and/or if the user does not want or need the ability to authorize an override, then the rate schedule and allocation can be eliminated. The use period UP is the duration of the full use period and can be used to evaluate the override options available. The use period start will be the time, or times in the hour that the use period will start. The invention also includes the process whereby the device controller would receive the use period and just one use period start from which the subsequent use periods would be calculated. The information in decision block 300 need only be transmitted when the system is first set up, when one of these values changes, and/or whenever the accuracy of the inventions components would warrant.

Process block 310 of FIG. 4 receives values of available power AP, use period remaining UPR transmitted from the power monitor and Forecast Errors FE transmitted from one or more device controllers in the system. The process stores these values and continues via 315 to decision block 316. Process block 316 provides an optional check via "IF UPR=0" to see if the use period has concluded. This equation could also be modified to check for a condition where the time is almost at the end of the use period, to prevent sequential system cycles from starting just before and then just after the value zero and effectively passing over the time UPR=0 decision trigger. Process block 316 logs available power AP, both positive and negative, at the end of each use period. This log of available power AP can be used for numerous evaluations and/or trend analysis. These evaluations could be used to indicate the appropriateness of the chosen allocation, or as an indicator that some of the loads in the facility may not be operating as expected.

The process continues via 317 to decision block 320 where the device controller checks to see if a run cycle is in process. This would most often occur when a conservation period had just been initiated whereby the on/off status of all device controller loads would be completely random. The invention acknowledges that if the device is running at decision block 320, the device load has been accounted for in the total load L on circuits measured by the power monitor. The invention provides the option for the process to go directly back to process block 310 via 323 and/or 335, bypassing the stop run cycle action in process block 330. This causes the device controller to enter a loop continuing through 310, 316 and 320 until the device's run cycle is ended via some other means. If optional process block 330 is used then it will stop the device and then proceed via 335 to process block 310 to receive an updated available power AP and use period remaining UPR after the device controller's load has be stopped. In one embodiment of the system, a power supplier could achieve an immediate load reduction by having process block 330 stop a run cycle when a conservation mode is started. Often during times of peak energy demand, power suppliers seek ways to reduce the demand to avoid overload, brown outs, black outs, etc. Load reductions could be achieved by this system when a power supplier either initiates a conservation mode or requests a lowering of the current allocation. By having process block 330 stop the run cycle, a quicker reduction in load could be realized.

An alternate use of the optional nature of process block 330 is for loads that incur abnormal wear if turned on and off too frequently. This would also be useful in applications where customers run the invention for long periods of time or even continuously. In this case the run cycle should be allowed to continue unless the total facility usage is reasonably close to the allocation and restricting the run time becomes necessary to maintain usage at or below the allocation. During periods when usage is sufficiently less than the allocation, it may be preferable to allow run cycles to continue when the process reaches block 330. The installer could set the system to use process block 330 when the energy usage of the previous period was greater than a percentage X of the allocation A where by X % is some value less than 100%.

When the process arrives at decision block 320 and finds the device is not running, the decision block directs the process via 327 to decision block 340 to determine if there is enough available power to support a minimum run cycle. A minimum run cycle is a run cycle that is considered worth running based on the nature of the device. In one embodiment of the invention, it may be determined that a run cycle of 2 minutes or less is relatively ineffective for the supported device. For this condition a run cycle will not be initiated unless the available power is sufficient for a run cycle greater than 2 minutes. Decision block 340 takes the available power, adds the forecast error values FE received from the other device controllers in the system. The adjusted power is converted into a supportable run time, by dividing it by the load of the device (not shown in equation). The supportable run time is compared to the minimum run cycle. At this point in the description forecast errors FE will be identified as errors in the power monitors forecast that can be quantified by the device controllers. These forecast errors FE are transmitted by each device controller to the other device controllers for the purpose of adjusting the available power predictions from the power monitor. Forecast errors FE will be explained further in the description of FIG. 4A, block 418. If the time period calculated in block 340 is less than the minimum run cycle, then the available power AP is considered not sufficient and the process is directed via 347 to process block 370, which keeps the power interrupted and prevents the initiation of a run cycle. The process continues from block 370 via 375 back to process block 310 to obtain updated values of available power AP and use period remaining UPR. The process stated above repeats, arriving at decision block 340 with updated values for available power AP and use period remaining UPR. When the process arrives at decision block 340 and the available power is sufficient for a minimum run cycle, the process continues to block 350 where the process will wait for a time period unique to the device controller.

The unique time period is part of a distributed decision process that causes multiple device controllers to operate their processes in sequence. When the invention is implemented with multiple device controllers, each device controller will be given a unique sequence number Q. The invention will also make use of a standard time increment. One standard time increment will be long enough for the overall system to respond to a change in total load. The standard time increment will be long enough to include such events as the power monitor detecting a change in total load, calculating a new available power AP, calculating a new use period remaining UPR, transmitting these values to the device controllers, device controllers transmitting updated forecast errors FE, allowing the device controllers to execute any changes resulting from the new values and allowing for a supported device to start a run cycle if needed. The unique time period for each device controller will be the device controller's sequence number times the standard time increment. By having each device controller wait a unique time period, each longer than the other, the invention uses distributed decision making to allow run cycles to start in the order of their sequence number. Once a device controller allows a run cycle, if the control system, native to the device, initiates a run cycle, the power monitor will detect the additional load of the device and proceed to update and transmit new values for available power AP and use period remaining UPR. Given the standard time interval is equal to or slightly longer than the response time of the full system, if a device controller allows a load to initiate, and the device does initiate its load, the other device controllers will receive updated values of available power AP and use period remaining UPR, from the power monitor, before they complete their unique wait periods, allowing them to react accordingly. For embodiments of the invention implementing just one device controller, the process in 350 could be eliminated or the sequence number Q could be set to zero for a zero wait period.

Once the device controller has waited its unique time period in block 350, the process continues to decision block 360, receiving updated values for available power AP, use period remaining UPR and forecast errors FE from process block 368 via 366 and 369. Process block 366 makes a check to see if the use period is about to end by checking if use period remaining UPR is equal to or nearly equal to zero. This equation in 366, as in process block 316, could be modified to check for a condition where the time is almost at the end of the use period, to prevent sequential system cycles from starting just before and then just after the value zero and effectively passing over the time UPR=0 decision trigger for storing residual values of available power. This logging of available power, both positive and negative, at the end of each use period can be used for numerous evaluations and/or trend analysis as noted previously for process block 316. Decision block 360 makes one more check after the unique wait period to make sure the current values for available power AP and forecast error are sufficient for a run cycle greater than the minimum run cycle for the supported device. If the current available power has reduced sufficiently such that a run cycle greater than the minimum cannot be supported, then decision block 360 directs the process via 347 to process block 370, which prevents the initiation of a run cycle and directs the process through the loop described earlier. If the current value of available power is sufficient to support a run cycle greater than the minimum, then decision block 360 directs the process via 363 to process block 380.

Process block 380, determines the run cycle duration RCD. This is a time duration for which the cycle can be supported with the power that is available. If a run cycle is initiated, one factor will be the power consumed during the load start surge. Depending on the nature of the load, the start up surge can be either a clean step increase in load or a brief start up surge several times that of the continuous load. To address the effects of a start up surge, the calculation of run cycle duration RCD uses the values for the supported devices surge load ST and continuous load CT. These values can be measured directly by the device controller or entered in manually by the system installer, or entered in by the manufacturer of the device controller or the device. In block 380, the amount of power consumed by the surge load is represented by the expression (ST*SD). The invention also includes the use of the power consumed during a surge load as a more accurate representation of power consumed, thereby recognizing the load profile of the surge load is not a perfect square wave as indicated by the simple expression (ST*SD). The difference between the two representations of the surge load is considered to be minimal and in turn for simplicity, the expression (ST*SD) will be used in this description. Also, in the expression of block 380, the available power AP is corrected with the forecast errors from the other devices by adding the summation of forecast errors $FE_y$, where y equals 1 to n where n equals the total number of device controllers in the system. Note, at this point in the device controller process the device load is not running and no forecast error FE has been calculated for this device controller. This leaves the forecast error FE of the device controller equal to zero. A corrected available power is calculated by adding the sum of the forecast errors to the available power AP received from the power monitor. From this calculation the surge load is subtracted resulting in the expression below:

$$AP + \sum_{y=1}^{n} FE_y - (ST*SD)$$

This value is an amount of power, which will be left after the start up surge load of the device. This amount of power is then divided by the continuous load CT of the device, resulting in a time period that the available power AP can support the device, subsequent to the start up surge. Lastly the equation in block 380 adds the time, or duration of the surge load SD, to the calculation of run cycle duration RCD. It is acknowledged that the duration of the surge load SD in many cases is very short and could easily be removed. By not adding the duration of the surge load SD, a small safety margin would be added to the run cycle duration RCD. This description acknowledges that the exclusion or inclusion of the surge is largely dependent on the magnitude of the surge load relative to the accuracy of the components used to construct the device controller and the desired accuracy of a given embodiment of the invention. The level of accuracy with which the surge load is addressed is therefore left to the discretion of the designer.

With the run cycle duration RCD determined in block 380, the process continues to block 390 of FIG. 4, where the run cycle duration RCD is compared to the use period remaining UPR. If the value of run cycle duration RCD is longer than the value of use period remaining UPR, the value of run cycle duration RCD is optionally set equal to the use period remaining UPR. The test and action in block 390 allows the run cycle to be stopped at the end of the use period, which prevents the device load from contributing to the measured total load L on circuits at the beginning of the next use period. The process in block 390 is not essential, but in some applications it will enhance the invention's ability to allocate the energy in accordance with the customer's objectives. The invention includes the option to not set the RCD equal to UPR based on other criteria. It is anticipated that during periods were usage is sufficiently less than the allocation; it may be preferable to allow run cycles to continue through the end of the use period. This would be useful in applications where customers run the invention for long periods of time or even continuously, in facilities with one or more controlled loads that could incur abnormal wear if turned on and off too frequently. To minimize the number of times the device controller ends a run cycle, the installer could set the system to use process block 390 only when the energy usage of the previous period was greater than a percentage X of the allocation A where by X % is a value less than 100%.

Figure 12:
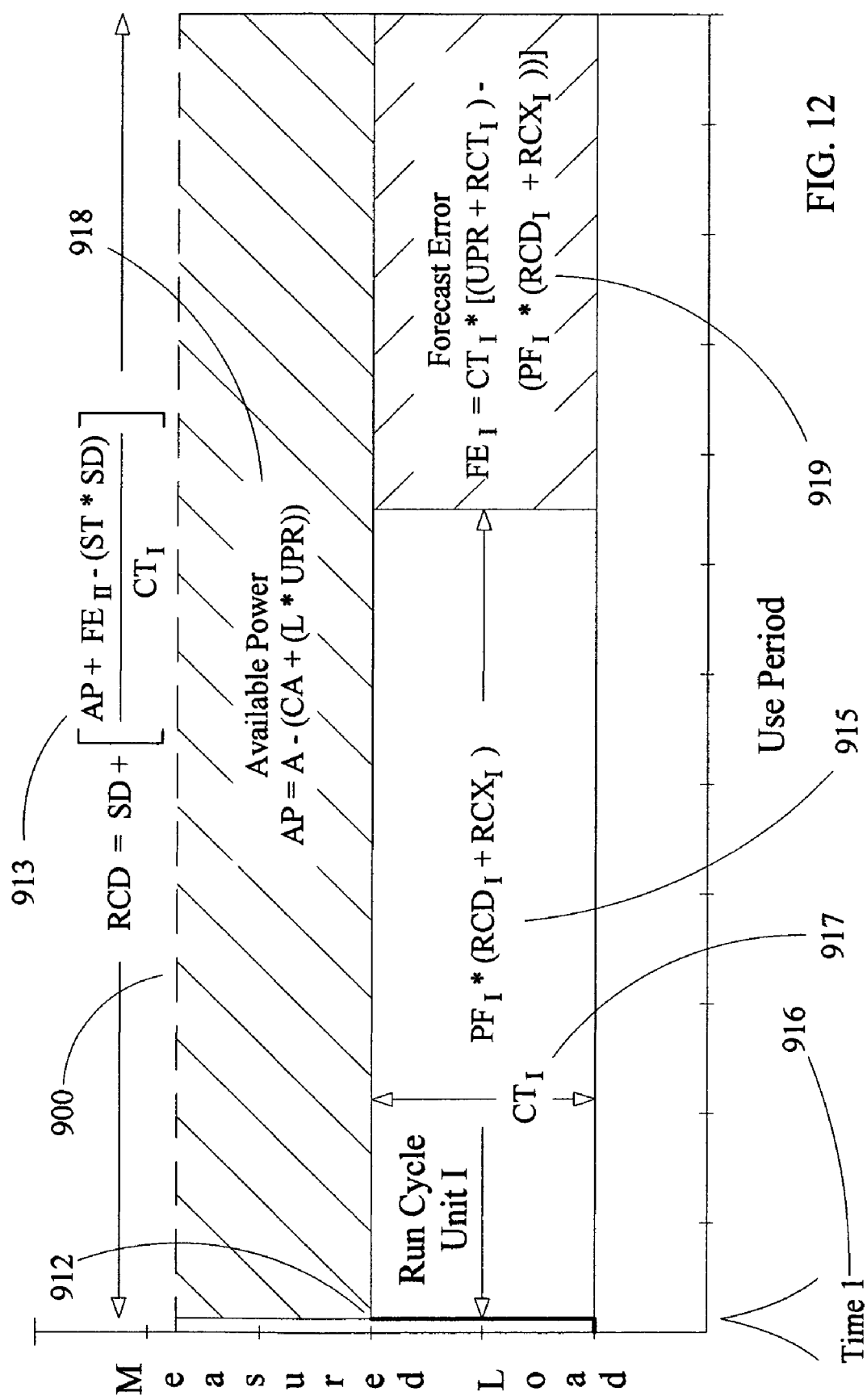

FIG. 12 provides a graphical presentation of the run cycle duration RCD for an example of a preferred embodiment of the invention. FIG. 12 shows the same system in FIG. 11, at Time 1, item 916, which is the time when the second available power prediction is determined by the power monitor. The value of run cycle duration RCD for Unit 1 and its calculation are shown in item 913 of FIG. 12. The equation in item 913 is the equation of process block 380 of FIG. 4. In this example there are two other device controllers, one of which will be calculating and transmitting a forecast error FE. With one other device controller calculating a forecast error FE in this example, the summation of forecast errors in process block 380 of FIG. 4 is represented by $FE_{II}$ in item 913. Given the relatively large available power AP in FIG. 11, the value of RCD is longer than the remainder of the use period. Therefore the value of run cycle duration RCD is changed to be equal to RCR via process block 390 of FIG. 4 and RCD is shown in FIG. 12 as ending at the end of the use period. Unit 1 has started its run cycle adding its load $CT_I$, item 917, to the measured load, item 912, at Time 1, item 916. The heavy line that ends at item 912 shows the profile of measured load, or history of power consumption, up to Time 1. The available power prediction is shown in cross hatch, item 918. The power monitor's calculation for available power prediction, per process block 166 of FIG. 3, is shown by the equation in item 918.

The process of FIG. 4 continues to block 394 where the device controller either initiates, or allows the initiation of, a run cycle limited to the run cycle duration RCD. The invention acknowledges that the device can have its own control system that will further determine whether or not a run cycle starts. Essentially, for a device with its own control system, the device controller allows the device to activate a run cycle and then only limits to the run cycle duration RCD or an adjusted run cycle that will be explained further with the use of run cycle change RCX. Process block 394 also sets the value of run cycle remaining RCR equal to the run cycle duration RCD. At this point the values of run cycle remaining RCR and run cycle duration RCD are equal, given it is the beginning of the run cycle. For each run cycle, the calculated value of run cycle duration RCD remains constant. The value of RCR is a value that reduces as time progresses through the run cycle. The process then continues via 395 to FIG. 4A.

In FIG. 4A the device controller process evaluates and adjusts the run cycle remaining RCR by way of the variable, run cycle change RCX. Run cycle change RCX is determined from changes in the available power AP, changes in the forecast errors FE from other device controllers and from any authorization override AO initiated by the customer. The device controller also determines its own forecast error FE and transmits this value to the other device controllers in the system. If other loads in the facility turn off or on, the resulting change in total load L on circuits will affect the available power AP. Recall available power AP can be a positive, zero or negative value. Changes in available power AP can also change the forecast errors FE being calculated by any or all of the device controllers in a system. The device controller will use the values it has calculated in combination with the updated values of available power AP from the power monitor and forecast errors FE from other device controllers, to calculate a run cycle change RCX which will adjust or change the final duration of its run cycle accordingly.

The device controller also incorporates a percentage factor PF that allows the customer to limit the amount of power consumed by the run cycle of the supported device. The percentage factors allow the customer to divide the available power among multiple device controllers. The processes in FIG. 4A also allow the customer the ability to override the system and authorize energy use in excess of the allocation, thereby supporting a longer run cycle. The processes also calculate and present the customer with the costs of various override choices prior to authorizing the override.

FIG. 4A begins with block 396 where the system waits for any control system native to the device to initiate a run cycle. Once a run cycle begins, the process continues to block 398 where the device controller waits the extended period. This extended period allows the power monitor to react to the load of the device just started, transmit updated values for available power AP and use period remaining UPR, and then for any other device controllers in the system to react to these new values and to calculate and transmit their new forecast error FE values. The extended period is intended to be longer than any unique wait period for any other device controller in a given system. If an implementation of the invention is for just one device controller, this process block can optionally be eliminated. The process continues with block 400 where the device controller enters a loop and receives updated values for available power AP, use period remaining UPR and forecast errors FE. The process continues via 405 to process block 408 where the invention will optionally log the value of available power at the end of the use period. This equation in 408, as in process blocks 316 and 366, could be modified to check for a condition where the time is almost at the end of the use period, to prevent sequential system cycles from starting just before and then just after the value zero and effectively passing over the time UPR=0 decision trigger for storing residual values of available power. This logging of available power, both positive and negative, at the end of each use period can be used for numerous evaluations and/or trend analysis as noted previously for process blocks 316 and 366.

The process continues to decision block 410, which checks if the run cycle should be terminated based on the calculated duration of the run cycle and the users preferences for power allocation to the corresponding device. This calculation checks if run cycle time RCT, or elapsed time since the cycle started, is greater than or equal to the run cycle duration RCD plus the run cycle change RCX, times the percentage factor PF. The value run cycle change RCX is an adjustment to the run cycle duration RCD, which is determined in process block 430. The value of run cycle change RCX will be explained in more detail in the description of block 430, but for now it is a time period, used by the device controller, to respond to changes in available power predictions AP during its run cycle. On the first pass through this loop, a value for RCX will not have been calculated and in turn will be zero. The percentage factor PF in the expression in block 410 is a percentage reflecting the customer's preference for how much available power should be allocated to the device controller's device. In decision block 410 the run cycle duration RCD is added to the run cycle change RCX and multiplied by the percentage factor for the intended duration of the run cycle. This intended duration is compared to the current run cycle time RCT. If the run cycle time RCT is less than the intended cycle duration PF*(RCD+RCX), then the run cycle has not consumed its intended share of the available power, and the condition in decision block 410 is false. For this false condition in block 410, the run cycle is not terminated and the process is directed via 417 to process block 418. A condition of true in decision block 410 will be addressed later in this description when the process returns to process block 410, via the upcoming loop.

In FIG. 12, item 915 shows the use of a percentage factor to adjust the run cycle for Unit I. The percentage factor has reduced the duration of the run cycle for unit I to that shown by item 915 from the duration shown in item 913. The expression in item 915 is from the equation used in decision block 410 of FIG. 4A.

In block 418 of FIG. 4A, the device controller determines its contribution to the power monitors forecast error. The device controller forecast error FE represents an amount of power that will not be used by the device controller, which in itself is a form of predicted available power. Recall the power monitor predicts the facility's current load will continue for the duration of the use period. Each device controller can calculate its contribution to an error in the power monitors prediction or forecast, and in turn its contribution to an error in the power monitors prediction of available power. For systems with two or more device controllers, the transmission of forecast errors back and forth between device controllers enable each device controller to use these forecast errors to correct the available power predictions from the power monitor. The device controller has values the use period remaining UPR and for the run cycle time RCT. The sum of these two values, (UPR+RCT) represent the time period the power monitor would have used in its forecast back when, or just after, the device controller allowed the start of its run cycle. From this point in the time interval the calculated values of percentage factor PF, run cycle duration RCD and run cycle change RCX become useful. Relative to the start of the device controllers run cycle, the run cycle will be stopped by decision block 410 when the run cycle time RCT is greater than or equal to the intended run cycle expressed as PF*(RCD+RCX). Therefore the device load will not be running for a time period equal to the time left in the use period at run cycle start (UPR+RCT) minus the time period of the run cycle (PF*(RCD+RCX)). This expression represents the time period the device controller's load will not be running. To convert this time to an amount of power to be added to the available power as a forecast error, the expression needs to be multiplied by the device load CT. This results in the forecast error equation in process block 418, also shown below:

$$FE_0 = CT*[(UPR+RCT)-(PF*(RCD+RCX))]$$

Essentially the equation above is the device load times the difference of, the use period remaining at the time the run cycle started, minus the time period the run cycle is predicted to run. The equation for the forecast error FE, of process block 418 is also shown as item 919 in FIG. 12, as it applies to the example. The equation of item 915 and process block 410 of FIG. 4A, will stop the run cycle of Unit I before the end of the use period creating the forecast error of item 919.

The forecast error $FE_0$ of process block 418 is then transmitted to the other device controllers in the system. The subscript 0 in $FE_0$ is intended to identify the device controller calculating this forecast error. When the device controller transmits its forecast error $FE_0$ to the other device controllers in the system, it will identify the FE with its own unique identifier instead of the subscripted identifier of 0. Forecast errors from each device controller will have a unique reference identifying the device controller that calculated the forecast error such as $FE_I$, $FE_{II}$, $FE_{III}$, $FE_{IV}$, $FE_V$, etc. This unique reference ensures forecast errors from each device controller are interpreted accurately and sequential transmissions from one device controller are not misinterpreted as two or more forecast errors from two or more device controllers.

In block 420, the process checks to see if the current predictions of available power AP, authorized override AO and forecast errors FE should cause a change in the current run cycle remaining RCR. The use of authorization override will be explained in more detail with the description of process blocks 450, 460 and 470 but for now should be considered an amount of power that a user decides to use in excess of the allocation. For explaining block 420, it is useful to remember that the power monitor can transmit a positive, a zero or a negative available power AP. When the available power AP is negative, even after forecast error FE adjustments, then device controllers will not initiate a run cycle (see blocks 340 and 360 of FIG. 4). However, when a device controller has started a run cycle based on a positive available power AP, and the available power becomes negative during the run cycle, the device controller can evaluate the extent to which its load is causing the forecast of negative available power. The device controller sums the available power AP, authorization override and all forecast errors FE from the device controllers in decision block 420. If this sum is equal to zero, then just the allocation usage is predicted for the end of the use period. If a value of allocation override AO is zero and/or has not been entered, then the available power is being compared to the sum of the forecast errors. If a negative available power is equal in magnitude to the positive forecast errors, then these will balance out and there is no indication the allocation will be exceeded. If the user has entered an authorization override AO, indicating they want to exceed the allocation, and if the sum with the allocation override AO is zero, then the forecast errors again are balancing out the available power AP and the allocation override AO, and there is no indication the allocation will be exceeded. Therefore if the equation in block 420 equals zero, then the indication is that the usage at the end of the use period will be equal to the allocation and authorization override. It is anticipated that the equation in block 420 may address the needs of some applications of the invention with a condition of the equation being equal to, or nearly equal to 0. The condition of nearly equal would be a condition equal to zero plus or minus a very small amount of energy. Having the ability to test for a status of nearly equal could avoid calculating very small run cycle changes on the order of a few seconds or even fractions of a second.

For systems that were designed to provide status to the customer, using a near equal condition could provide more stable reports and/or reduce what might be perceived as reporting noise in the system. For a condition where the equation in decision block 420 is equal to or nearly equal to zero, there is no need to change run cycle change RCX and decision block 420 directs the process via 423 to block 450. A description of block 450 will follow after the description of process blocks 430 and 440. If in decision block 420 the equation does not equal zero then the process is directed via 427 to process block 430 where a new run cycle change is calculated.

The process arrives in block 430 when usage is predicted by block 420 to be less than or greater than the total of the allocation and the allocation override. If usage is predicted to be less than the allocation and allocation override, then the run cycle will be extended with a larger and/or positive RCX, which will use more if not all of the allocation. If usage is predicted to be more than the allocation and allocation override, then the run cycle can be reduced with a smaller and/or negative RCX, which will reduce usage such that it is less than or equal to the allocation. The numerator of the expression in block 430 is similar to the expression on the left side of the equal sign in the equation in block 420. The difference being that the device controller subtracts out the value of its own forecast error $FE_0$ from the expression. Note a contributor to the device controller's forecast error $FE_0$ is the percentage factor in blocks 410 and 418. Recall the percentage factor is used in block 410 to control the power allocation to the supported device in accordance with the users preferences. The percentage factor causes the device controller's run cycle to take less than the full run cycle allowed by just a calculation on available power. The affects of the percentage factor are further incorporated in the calculation of forecast errors in block 418. If each device controller were to leave its own forecast error $FE_0$ in the summation of all forecast errors 1 to n, then the calculations in block 430 would create values of RCX that would work to counter the effect of the percentage factor in block 410. To avoid this each device controller subtracts out the value of its own forecast error $FE_0$ in the numerator:

$$AP + AO - FE_0 + \sum_{y=1}^{n} FE_y$$

This amount of power is converted to a time by dividing it by the devices continuous load CT resulting in the run cycle change RCX needed to use most or all of the allocation.

Figure 13:
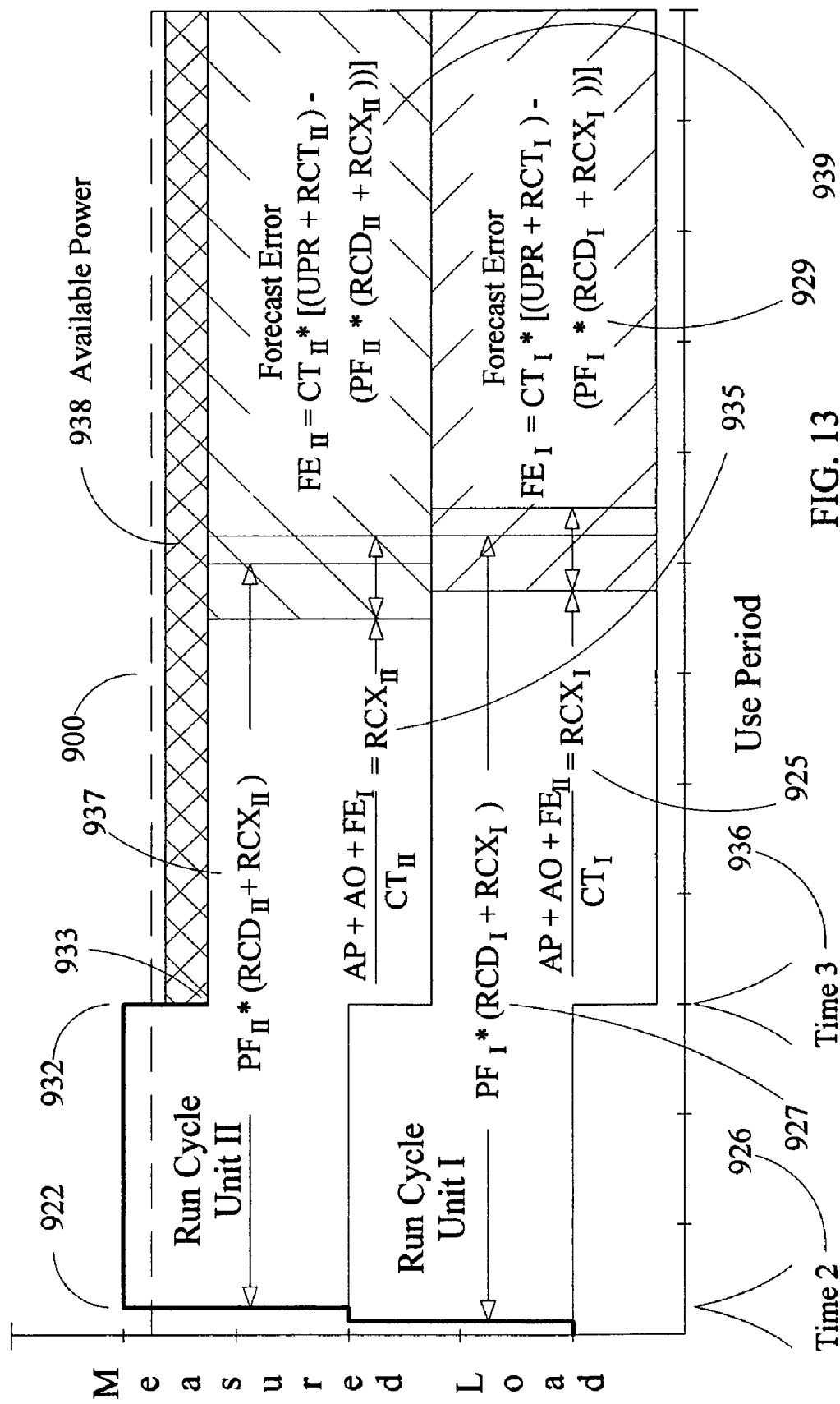

FIG. 13 provides a graphic example of the calculation of RCX. FIG. 13 is a continuation of FIGS. 11 and 12 moved ahead in the use period to Time 2, item 926, which is the next calculation of available power after Time 1 in FIG. 12. Time 3, item 936, of FIG. 12 is a later time in the use period when the uncontrolled loads have dropped. At Time 2, item 926, the device controller for Unit II has allowed its device to start its load. Unit II has started bringing the total facility load to that of item 922. The device controller supporting Unit II has also calculated its forecast error, item 939 and transmitted it to the other device controller(s) in the system. At Time 3, item 936, the uncontrolled loads drop, which reduces the total facility load, measured by the power monitor, from item 932 to item 933. The heavy line, ending at item 936 represents the load profile and/or history of power consumption, measured by the power monitor at Time 3. Item 938 (perpendicular cross hatch) is the available power prediction calculated by the power monitor, using the equation in process block 166 of FIG. 3. The available power of item 938 and the forecast error $FE_{II}$, item 939 are used to calculate $RCX_I$, item 925. The predicted available power, item 938, and the forecast error $FE_I$, item 929, are used to calculate $RCX_{II}$, item 935. The drop in load at Time 3 increases the available power item 938, which causes item 925 to calculate a positive run cycle change RCX. These positive changes in run cycle change RCX are shown by the arrows on the right side of items 925 and 935. Items 927 and 937 use the new values of $RCX_I$ and $RCX_{II}$ to determine a time for their respective run cycles to stop. These run cycle stop times are shown by the arrows to the right of the equations of items 927 and 937. The times for run cycle stop, items 927 and 937, are used in the calculations of forecast errors $FE_I$ and $FE_{II}$ to be processed with the next available power predictions AP from the power monitor. The forecast error calculations of items 929 and 939 are from process block 418 of FIG. 4A and the run cycle change RCX calculation of items 925 and 935 are from process block 430 of FIG. 4A. The values of $RCX_I$ and $RCX_{II}$ are then used in items 927 and 937 respectively. Items 927 and 937 are equations from block 410 of FIG. 4A.

The process in FIG. 4A continues to process block 440 where the new value of run cycle change is checked to see if it will continue the run cycle through the end of the use period. Process block 440 provides the option of ensuring the run cycle will stop by the end of the use period. It is anticipated that during periods were usage is sufficiently below the allocation, it may be preferable to allow run cycles to continue through the end of the use period. For loads that are not designed to be tuned on and off frequently the process of ending the run cycle at the end of every time interval may add unnecessary wear and tear on the load, especially if the customer would like to leave the invention running continuously or for long periods of time. For such implementations of the invention, it may be preferable to allow run cycles to continue through the end of the time interval when normal usage is sufficiently less than the set allocation. When usage levels are sufficiently below the allocation levels, the calculations of available power AP will be relatively high during these use periods. If the device run cycles continue through the end of a use period, the device controller will calculate larger forecast errors in the subsequent use period, which will result in run cycle changes that increase the run cycle remaining. In this circumstance, the control system native to the load will frequently turn off the load before the device controller determines a run cycle stop is warranted based on allocation usage. When the load turns off at the direction of the native control system, the power monitor will detect the drop in load, which will cause an increase in predictions of available power. The increase in available power will most likely lead to increases in run cycle durations RCD and run cycle changes RCX that will again allow more run time than the native control system deems necessary. For applications of this type the processes in block 440 could be optional or dynamic. The installer could set the system to use process block 440 when the energy usage of the previous period was greater than a percentage X of allocation A, where by X % is some value less than 100%.

An alternate method for preventing the system from ending the run cycles at the end of a use period would be to have the system's power monitor, monitor the facility's usage and only transmit available power levels when the available power AP at the end of the previous time interval was at or below a level or percentage of allocation, set by the customer. Device controllers would not detect available power AP transmissions and therefore would not initiate their processes to control the run time of their loads. Until the usage exceeded the set threshold, the system would not control run cycles.

With an adjusted value of run cycle change RCX the process continues via 423 to process block 450. This is also the point where decision block 420 leads when the value of available power AP, authorization override, and the summation of forecast errors FE indicates there is no need to calculate a new value of run cycle change RCX.

In process block 450 the system updates a status that can be presented to the user with the option of overriding the current allocation and consuming more energy. Process block 450 can use any of the values or parameters transmitted from the power monitor, other device controllers along with any values and parameters known to the device controller to report a status to the user in a format that is meaningful for the purpose of the supported device. Process block 450 could offer the customer the ability to make adjustments to the system along with the ability to adjust the allocation with an authorized override. Authorization overrides could also be presented with the cost of these overrides. This process block would use the rate structure to evaluate these costs and in turn the specific processes for any application would be dependent of the nature of the rate structure. The number of possible processes for block 450 is as numerous as the many possibilities for the design of rate structures. Whatever the design of the rate structure, the processes in block 450 should be designed to interpret the rate structure and present the user with clear, relevant options for using more power and overriding the allocation. It is conceivable that suppliers during times of high demand may also offer customers lower rates, rebates or credits for using less power during a time of peak demand. To take advantage of these offers, a customer may enter a negative authorization override to reduce the allocation to a desired level. In these circumstances, process block 450 would present these opportunities for cost savings to the customer.

The process continues to decision block 460 where the customer is given the option to override the allocation. If they chose not to initiate an override then the value of authorization override AO is zero and the process will continue via 467 back to process block 400 where new values for available power AP and use period remaining UPR will be received from the power monitor. If the customer chooses to initiate an override, either an allocation increase or decrease, the process continues via 463 to process block 470 where the customer inputs the level of override. A conversion may take place in block 470 whereby the user enters a cycle time change, or other change value relative to the purpose of the supported device, which will then be converted to units of power consistent with the units used to set the allocation. The user may also enter a change in power directly, in which case there would be no need for a conversion. This value of power for authorized override is transmitted to the other device controllers in the system and added to available power AP in process blocks 420 and 430 to increase the amount of power used by the device controller. The device controller can be configured to require an authorization override for each use period, for the duration of a current conservation period, or for any number of subsequent use periods. The invention acknowledges that the effect of AO will be reduced by the percentage factor PF in the calculations of blocks 430 and 410. Depending on customer preference, the value of authorized override AO may or may not be adjusted by the percentage factor. Note that if the authorized override is divided by the percentage factor PF in process block 470, it will counter the effect of the percentage factor PF in decision block 410. Adjustments to authorized override, to compensate for the multiplying by percentage factor PF can be incorporated in either process block 470, 430 or 410 by dividing the value of authorized override AO by percentage factor PF. An additional consideration regarding the application of the percentage factor to the authorized override is whether or not the user intends the authorized override to affect one device being supported by device controller or by all devices in the system being supported by a device controller. It is also acknowledged that the allocation override variables AO in the equations of blocks 420 and 430 do not have summation symbols before them. The expectation is that authorization overrides will be occasional and in normal operation there will seldom be more than one override over the course of several use periods, provided the allocation is set at a comfortable and/or acceptable level. However the scope of the invention does include the possibility that allocation overrides would be initiated multiple times at multiple device controllers in a given time interval. For this circumstance the scope of the invention does included the use of summation signs before the variable AO in blocks 420 and 430, for all allocation overrides $AO_y$ for all values of y from 1 to n, with n being the number of overrides allowed by the system. In such circumstances, it is anticipated that high numbers of authorization overrides would prompt the customer to increase the allocation to alleviate the need for frequent customer intervention. Once a suitable authorized override AO has been determined in block 470, the process then continues to block 400 to repeat the loop. The loop will continue until the run cycle time is greater than or equal to the value of PF*(RCD+RCX) in decision block 410. When the condition in decision block 410 is true, the process is directed to block 480 to end the run cycle.

From block 480 the process continues to process block 490. At process block 490, there will be an extended wait period before the device controller returns to block 310 in FIG. 4. The extended wait period is intended for implementations of the invention with multiple device controllers. The extended wait period in process block 490 is the same extended wait period in process block 398. The extended wait period in block 490 is intended to allow all other device controllers, with lower sequence numbers, to initiate their run cycles ahead of the device controller that has just finished its run cycle. Without the extended wait period, there exists the possibility of a device controller with a higher priority, or numerically lower, sequence number, potentially using all or nearly all of the available power AP with repetitive run cycles that start before other device controllers finish their unique wait periods. If the device controllers are given priority factors that intend to apportion the available power among the device controllers, then the extended wait period helps insure that each device controller has an opportunity to initiate a run cycle. Process block 490 also offers the option to have the device controller wait until after the beginning of the next use period before it allows its device another run cycle. Process block 490 also offers the option to log the available power AP at the end of the use period as it is done in process blocks 316 and 366 of FIG. 4 and block 408 of FIG. 4A. From block 490, the process returns to block 310 of FIG. 4.

Figure 5:
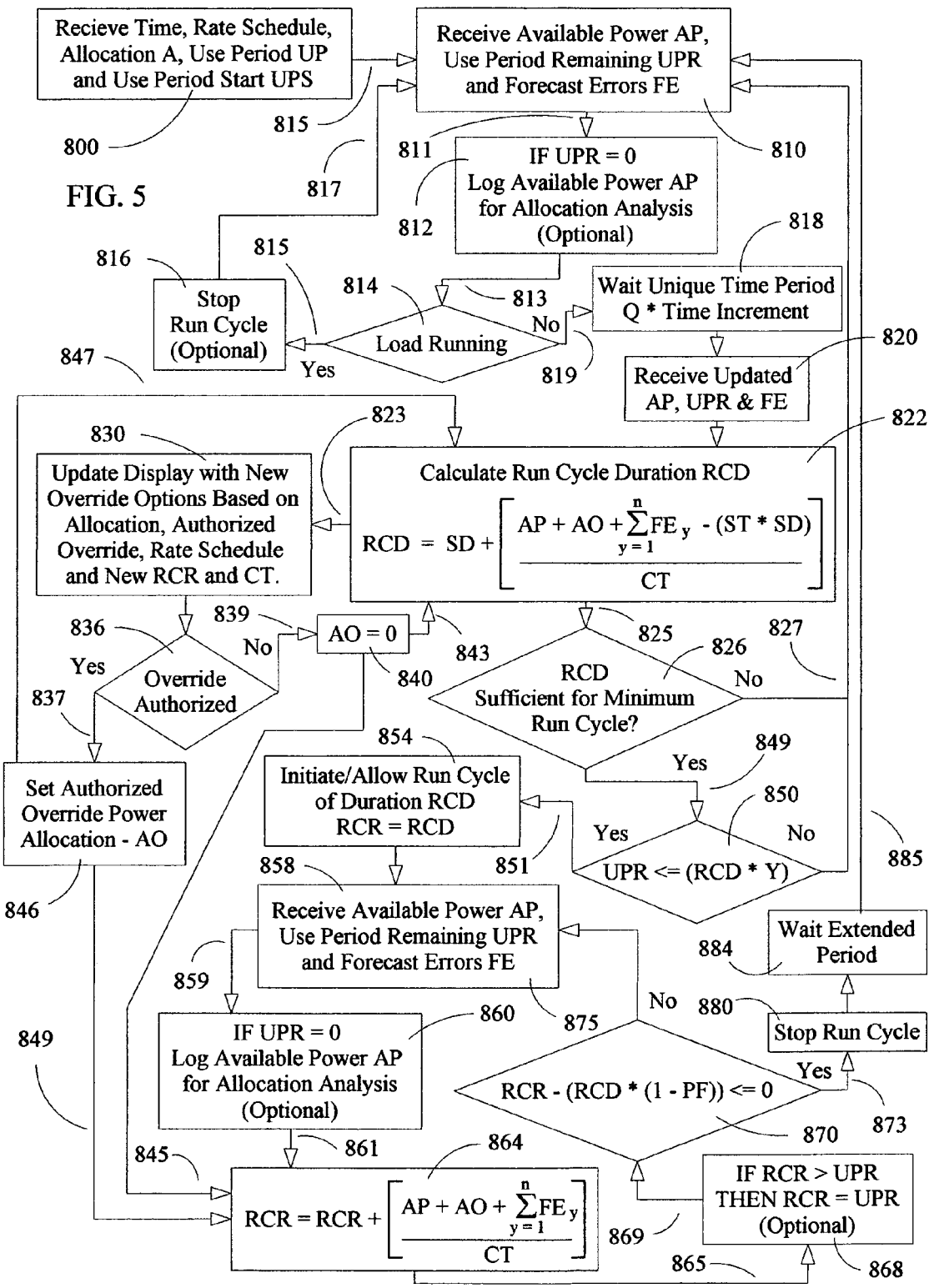
FIG. 5 is a flow diagram for a second device controller process that determines the run cycle duration for the supported load and any subsequent changes in run cycle duration based on transmissions of available power, in accordance with the present invention.

FIG. 5 provides the processes for a device controller implementing a run cycle for its supported device towards the end of the use period. The process begins in block 800 where the device controller receives the transmissions of current time, rate schedule, allocation A, use period UP and use period start UPS from the power monitor. The time will be used to synchronize the device controller's clock. The rate schedules will be used to calculate the cost of an allocation override. The allocation will be used to determine the price point in the rate schedule, if applicable, from which the cost of overrides will be based. This allows for one rate schedule with multiple rates and/or multiple allocation choices to be used with a multiplicity of customers. If the user does not want or need the system to present the cost of an override, and/or if the user does not want or need the ability to authorize an override, then the rate schedule and allocation can be eliminated. The use period UP is the duration of the full use period and can also be used to evaluate the override options available. The use period start will be the time, or times in the hour that the use period will start. The information in block 800 need only be transmitted when the system is first set up, when one of these values changes, and/or whenever clock synchronization is advisable.

Process block 810 of FIG. 5 will receive predictions of available power AP and use period remaining UPR being transmitted from the power monitor and the forecast errors FE being transmitted from other device controllers in the system. The process stores these values and continues via 811 to process block 812. Process block 812 provides an optional check via "IF UPR=0" to see if the use period has concluded. This equation could also be modified to check for a condition where the time is almost at the end of the use period, to prevent sequential system cycles from starting just before and then just after the value zero and effectively passing over the time UPR=0 decision trigger for storing residual values of available power. This logging of available power, both positive and negative, at the end of each use period can be used for numerous evaluations and/or trend analysis. These evaluations could be used to indicate the appropriateness of the chosen allocation, or as an indicator that some of the loads in the facility may not be operating as expected.

The process then continues via 813 to decision block 814. Decision block 814 is for the beginning of a conservation period when a device controller has not yet calculated a run cycle. The invention acknowledges that if the device is running at decision block 814, the device load has been accounted for in the total load L on circuits, measured by the power monitor. The invention provides the option for the process to go directly back to process block 810 via 815 and/or 817, bypassing the optional stop run cycle action in process block 816. This causes the device controller to enter a loop continuing through 810 and 814 until the device's run cycle is ended via some other means. In one embodiment of the invention, a power supplier could achieve an immediate load reduction by having process block 816 (as with block 330 of FIG. 4) stop a run cycle when a conservation mode is started. Often during times of peak energy demand or in the event of a sudden failure at a power plant or in the electric grid, power suppliers seek ways to reduce the demand to avoid overload, brown outs, black outs, etc. Load reductions could be achieved by this system when a power supplier either initiates a conservation mode or requests a lowering of the current allocation. The invention also includes the option of stopping the run cycle in block 816 for a preset period of time at the beginning of the conservation period for the purpose of enhancing the supplier's ability to reduce load during times of peak demand or failure in the electric generation and delivery system. By having process block 816 stop the run cycle, a quicker reduction in load could be realized. If optional process block 816 is used then it will stop the device and proceed via 817 to process block 810 to receive an updated available power prediction AP, use period remaining UPR and forecast errors now that the device controller's load has been stopped.

An alternate use of the optional nature of process block 816 is for loads that would incur abnormal wear if turned on and off too frequently. This would be useful in applications where the customer would like to leave the invention running for long periods of time or even continuously. In this case the run cycle should be allowed to continue unless the total facility usage is reasonably close to the allocation and restricting the run time becomes necessary to maintain usage at or below the allocation. During periods when usage is sufficiently below the allocation, it may be preferable to allow run cycles to continue when the process reaches block 816. The installer could set the system to use process block 816 when the energy usage of the previous period was greater than a percentage X of the allocation A where by X % is some value less than 100%.

When the process arrives at decision block 814 and finds the device is not running the decision block directs the process via 819 to process block 818 where the process will wait for a time period unique to the device controller. The unique time period is part of a distributed decision process that causes multiple device controllers to operate their processes in sequence. When the invention is implemented with multiple device controllers, each device controller will be given a unique sequence number Q. The invention will also make use of a standard time increment. One standard time increment will be long enough for the overall system to respond to a change in total load. The standard time increment will be long enough to include such events as the power monitor detecting a change in total load, calculating a new available power prediction AP, calculating a new use period remaining UPR, transmitting these values to the device controllers, device controllers transmitting updated forecast errors FE, allowing the device controllers to execute any changes resulting from the new values and allowing for a supported device to start a run cycle if needed. The unique time period for each device controller will be the device controller's sequence number times the standard time increment. By having each device controller wait a unique time period, each longer than the other, the invention uses distributed decision making to allow run cycles to start in the order of their sequence number. Once a device controller allows a run cycle, if the control system, native to the device, initiates a run cycle, the power monitor will detect the additional load of the device and proceed to update and transmit new values for predicted available power AP and use period remaining UPR. Given the standard time interval is equal to or slightly longer than the response time of the full system, if a device controller allows a load to initiate, and the device does initiate its load, the other device controllers will receive updated predictions of available power AP and use period remaining UPR, from the power monitor, before they complete their unique wait periods, allowing them to react accordingly. For embodiments of the invention implementing just one device controller, the process in 818 could be eliminated or the sequence number Q could be set to zero for a zero wait period.

Once the device controller has waited its unique time period in block 818, the process continues to process block 820, which receives updated predictions for available power AP, use period remaining UPR and forecast errors FE. The process of block 820 is equivalent to the process of block 810, and of process block 858, but has been abbreviated for the purpose of drawing convenience. The process continues to block 822 where the available power AP, authorized override AO and forecast errors FE are used to calculate an allowable run cycle duration RCD. This value is a measure of time for which the cycle can be supported with the power that is available. If a run cycle is initiated, one factor will be the power consumed during the load start up. Depending on the nature of the load, the start up surge can be either a clean step increase in load or can be a brief start up surge several times that of the continuous load. To address the effects of a start up surge, the calculation of run cycle duration RCD uses the values for the supported devices surge load ST and continuous load CT. These values can be measured directly by the device controller or entered in manually by the system installer, or entered in by the device manufacturer in cases where the functionality of the device controller is integrated into the device. In block 820, the amount of power consumed by the surge load is represented by the expression (ST*SD), or the surge load ST times the surge load duration SD. The invention also includes the use of the power consumed during a surge load as a more accurate representation of power consumed, thereby recognizing the load profile of the surge load is not a perfect square wave as indicated by the simple expression (ST*SD). The invention includes the representation of surge load at any level of accuracy deemed appropriate for the application of the system. For the purposes of simplicity, the expression (ST*SD) will be used in this description. Also, in the expression of block 820, the available power AP is corrected with the forecast errors from the other devices by adding the summation of forecast errors $FE_y$, where y equals control devices 1 to n, where n equals the total number of device controllers in the system. Since this device controller process intends to execute its run cycle at the end of the use period, there is no forecast error to calculate given the run cycle will most likely stop at or just before the end of the use period. By continuing the run cycle to the end of the use period, the run cycle would match the forecast made by the power monitor and the forecast error would be zero. It should also be noted that a run cycle stop at or near the end of the use period is not assured as another process of this device controller, addressed in more detail with the description of decision block 870, is to correct for any increase in the total load L on circuits towards the end of the use period, by stopping its run cycle sufficiently before the end of the use period to prevent the increase in the total load L on circuits from exceeding the allocation. In process block 820 a correct available power is calculated by adding any authorized override AO plus the sum of the forecast errors, to the predicted available power AP received from the power monitor. From this calculation the surge load is subtracted resulting in the expression below:

$$AP + AO + \sum_{y=1}^{n} FE_y - (ST * SD)$$

This value is an amount of power, which will be left after the start up surge load of the device. This amount of power is divided by the device's continuous load CT, resulting in a run cycle time that the corrected available power can support the device, subsequent to the start up surge. Lastly the surge load duration SD is added to the run cycle time resulting in run cycle duration RCD. It is acknowledged that the duration of the surge load SD in many cases is very short and could easily be removed. Removing the duration of the surge load SD would simplify the equation and add a small safety margin to the run cycle duration RCD. This description acknowledges that the exclusion or inclusion of the surge is largely dependent on the magnitude of the surge load relative to the accuracy of the components used to construct the device controller and the desired accuracy of a given application of the invention. Therefore, the level of accuracy with which the surge load is addressed by a given implementation of the invention, is left to the discretion of the designer.

Figure 14:
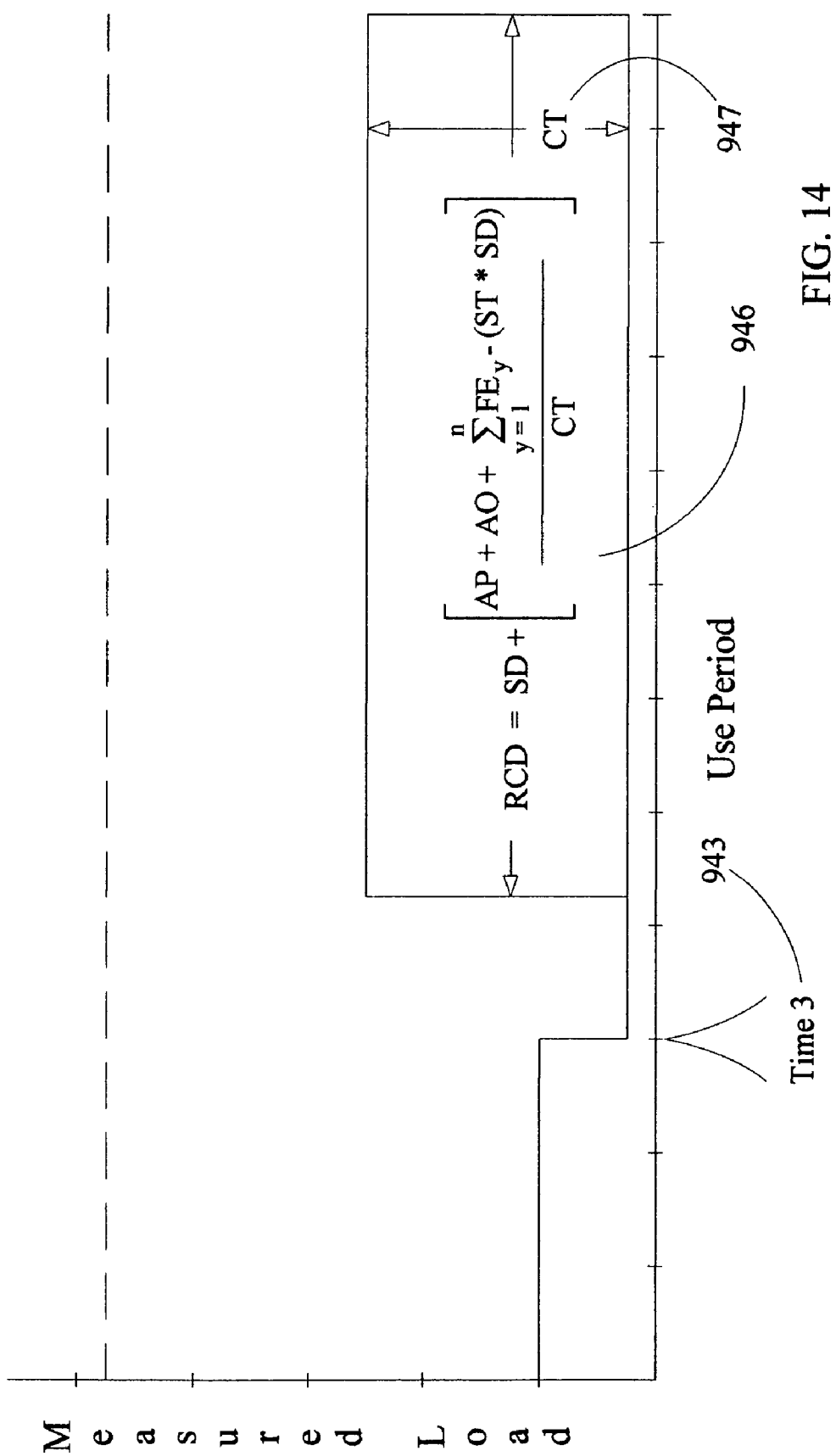

FIG. 14 provides a graphic example of the calculation in process block 822 of FIG. 5 for an example of a preferred embodiment of the invention. Time 3, item 943 is the same time as Time 3, item 936 in FIG. 13. In FIG. 14 the graphical presentations of the run cycles and forecast errors of Units I and II have been removed for clarity and will be reintegrated in FIG. 17. Item 946 calculates the run cycle duration RCD based on the available power predictions AP from the power monitor, any authorized overrides AO and the forecast errors FE transmitted by the other device controllers in the system. The summation of these powers is essentially the area on the graph that is RCD, item 946, wide and device load CT, item 947 high. Note, that in FIG. 14 where the run cycle duration RCD is set to end at the end of the use period, the beginning of RCD does not reach Time 3, item 943. With this condition, the device controller will not allow the device to start a run cycle. This process will be explained further with the description of block 850 of FIG. 5.

From block 822 of FIG. 5, the process continues in two directions. One direction is to process block 830, which leads to the process for the customer interface and the setting of authorized overrides. The other direction is to decision block 826, which leads to the process for initiating and managing the run cycle duration. Since the authorized override in block 830 affects future processes, it will be explained later in this description and the processes initiated via path 825 and block 826 will be explained next. Decision block 826 checks to see if the calculated run cycle duration is sufficient for a minimum run cycle similar to the checks of blocks 340 and 360 of FIG. 4. A minimum run cycle for the purposes of this invention can be virtually any length of time within the use period, and is primarily dependent on the nature and/or requirements of the device being supported by the device controller. If the run cycle is not sufficient for a minimum run cycle then decision block 826 directs the process via 827 to process block 810. This repeats the process described earlier through 810, 814, 818, 820 and 822 whereby the available power predictions, authorized override and forecast errors are monitored until a condition exists in decision block 826 whereby a minimum run cycle can be supported. When decision block 826 finds the run cycle duration to be sufficient, it directs the process via 849 to block 850. In decision block 850 the use period remaining UPR is compared to the run cycle duration RCD. Decision block 850 checks to see if the time remaining in the use period is less than or equal to the run cycle duration. The factor Y is intended to allow the customer to adjust the allowed start of the run cycle relative to the end of the use period. If the installer chooses a value of Y that is less than 100% there will be a safety margin incorporated that will help prevent increases in background load towards the end of the use period, from causing usage to exceed the allocation. When value of Y is less than 100%, then there essentially is not enough time left in the use period for the load to consume the available power. This inability to use all the available power creates a safety margin. If the installer chooses a value of Y that is larger than 100% then it is more likely that all of the allocation will be used and the device controller will have to stop the run cycle before the end of the use period to avoid a usage that exceeds the allocation. The process of stopping the run cycle before the end of the use period will be discussed later with the description of block 870. Setting Y to a value larger than 100% also provides the installer the ability to start the run cycle earlier in the run cycle if such a load pattern is deemed beneficial. A factor Y that is equal to 100% will allow a run cycle start when the run cycle duration is equal to the use period remaining. Setting Y equal to 100% intends for the supported load to use all the remaining available power and in turn the full allocation. In decision block 850, if the condition is true then the run cycle will be allowed to start and will be running for most of the remaining use period. With the device running towards the end of the use period, its cycle can still be shortened if an uncontrolled load turns on and consumes some of the allocation. If an uncontrolled load turns off during the run cycle then the device controller can use the unused allocation by extending the run cycle remaining, if the value of Y is greater than 100%. The value of Y provides the installer a range of system options with which to customize operation to the application. In decision block 850, if the condition is false, then the process will be directed via 827 back to process block 810 to continue monitoring available power predictions, authorized overrides and forecast errors via 810 thru 822 until the condition in decision block 850 is satisfied.

Figure 15:
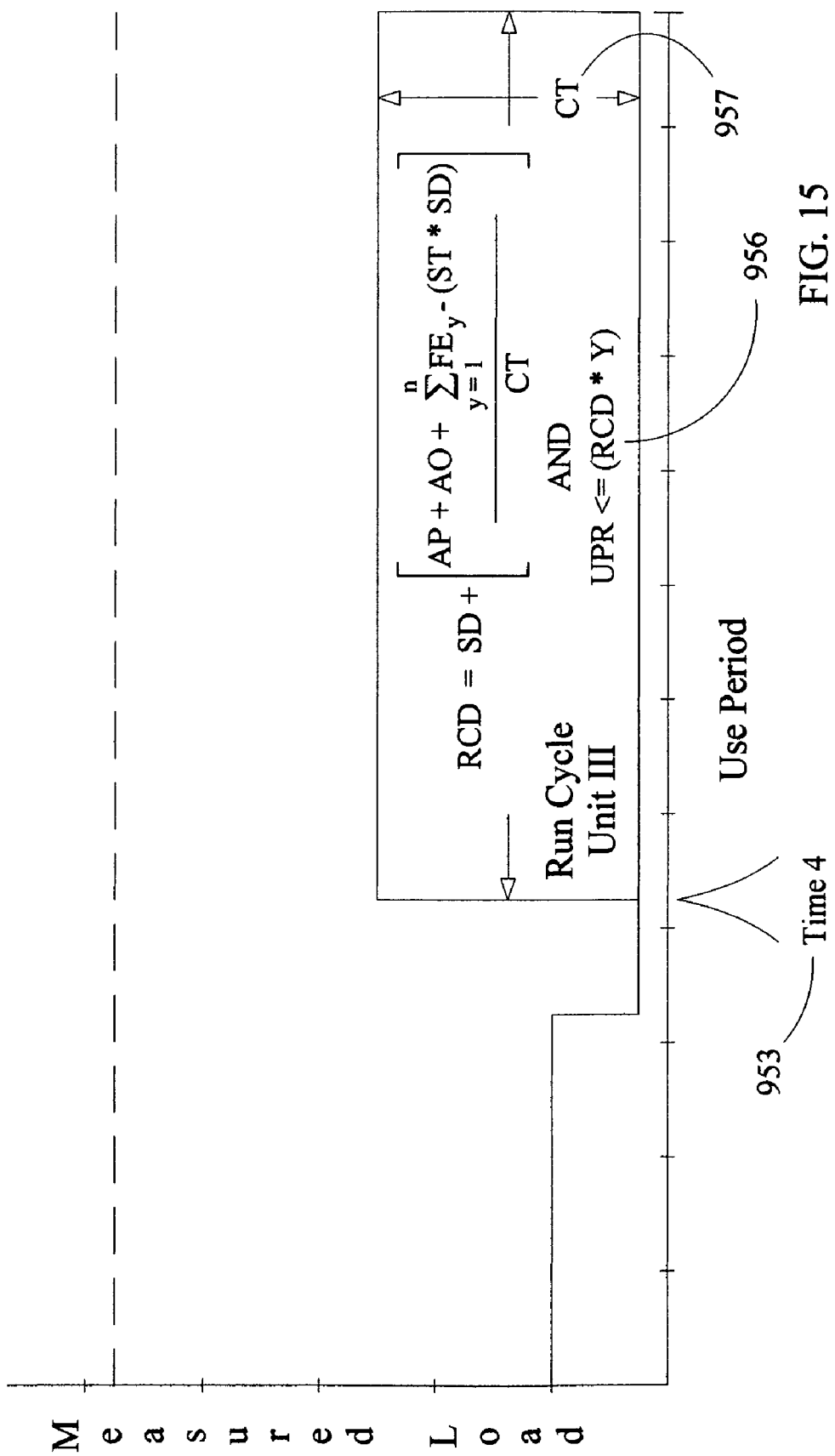

FIG. 15 provides a graphic example of the calculation in process blocks 822 and 850 of FIG. 5 for an example of a preferred embodiment of the invention. In FIG. 15 the time has progressed to Time 4, item 953. At Time 4, the value of run cycle duration RCD for Unit III equals the use period remaining UPR. This satisfies the equations in item 956 and the device controller will allow the load of its supported device to start. The calculations in item 956 are the equations from process blocks 822 and 850 of FIG. 5. With the conditions of item 956 met, the power represented by the load of the device CT times the time run cycle duration RCD, is equal to the power in the available power prediction and Unit III is allowed to start a run cycle at Time 4.

Once the condition of decision block 850 is satisfied, the process continues via 851 to block 854 where the process allows the run cycle to initiate. Also in block 854, since the run cycle is just starting, the run cycle remaining RCR is set equal to the run cycle duration RCD. The value of run cycle remaining RCR is a dynamic variable that declines with time to represent the amount of time left in the run cycle.

Once process block 854 has allowed the run cycle to begin and control systems native to the device have initiated a run cycle, the process moves on to block 858 and waits to receive a new prediction of available power AP and use period remaining UPR from the power monitor, along with forecast errors, if any, from other device controllers in the system. The process continues via 859 to 860 where the prediction of available power is optionally logged if the use period remaining is at or near zero. The purpose of process block 860 is the same as that described for process block 812. The process then continues via 861 to decision block 864 where the updated available power prediction AP, any change in authorized override AO and the summation of any forecast errors, are used to adjust the run cycle remaining RCR. Given the calculations in process block 820 and decision block 850 causes nearly all the available power to be used during the end of the use period, the available power forecast by the power monitor should be zero or near zero, unless there is a change in the background load. If there is no change in background load, and the customer has not authorized any value for authorized override AO, then the expression in block 864 (shown below) will be zero or nearly zero.

$$AP + AO + \sum_{y=1}^{n} FE_y$$

This near zero term will still be near zero after being divided by the continuous load CT, which will result in a zero or near zero change in run cycle remaining RCR. If the background load reduces during the run cycle, the predicted available power will increase and the effect of process block 864 will be to increase the run cycle remaining. If the customer authorizes an override AO then the effect of process block 864 will be to increase the run cycle remaining. If the customer authorizes an override AO that reduces the allocation then the effect of process block 864 will be to decrease the run cycle remaining. If background loads increase then the effect of process block 864 will be to compensate by decreasing the run cycle remaining.

Once the adjustment has been made in block 864 the process continues via 865 to decision block 868. In block 868 the run cycle remaining RCR is tested to see if it will continue the cycle beyond the end of the use period. If the value of run cycle remaining RCR is longer than the value of use period remaining UPR, the value of run cycle remaining RCR is optionally set equal to the value of use period remaining UPR, which would end the run cycle at the end of the use period. It is anticipated that during periods were usage is sufficiently below the allocation, it may be preferable to allow run cycles to continue through the end of the use period. For loads that are not designed to be turned on and off frequently the process of ending the run cycle at the end of every time interval may add unnecessary wear and tear on the load, especially if the customer would like to leave the invention running continuously or for long periods of time. For such implementations of the invention, it may be preferable to allow run cycles to continue through the end of the time interval when normal usage is sufficiently less than the set allocation. When usage levels are sufficiently below the allocation levels, the calculations of available power AP will be relatively high during these use periods. If the device run cycles continue through the end of a use period, the device controller will calculate larger forecast errors in the subsequent use period which will result in run cycle changes that increase the run cycle remaining. In this circumstance, the control system native to the load will frequently turn off the load before the device controller determines a run cycle stop is warranted based on allocation usage. When the load turns off at the direction of the native control system, the power monitor will detect the drop in load, which will cause an increase in available power. The increase in available power will most likely lead to increases in run cycle durations RCD, increases in run cycle changes RCX and increases in adjustments to run cycle remaining RCR, that will again allow more run time than the native control system deems necessary. For applications of this type the processes in block 868 could be optional or dynamic. The installer could set the system to use process block 868 when the energy usage of the previous period was greater than a percentage X of the allocation A, where by X % is some value less than 100%. This would prevent run cycle terminations at the end of each time interval that might otherwise add unnecessary wear and tear on the load being controlled by the device controller. The process continues via 869 to process block 870.

In block 870 the run cycle remaining is tested to see whether or not it is time to end the run cycle. The expression in 870 incorporates the use of a percentage factor PF, which is a value input by the customer or installer. The percentage factor PF provides additional control over the device controller. The percentage factor PF can be used to incorporate a safety factor to compensate for a facility with very random and relatively high background loads. The percentage factor in such cases can be used to incorporate a safety margin against uncontrolled loads causing the allocation to be exceeded. This safety factor is similar to the use of the factor Y in decision block 850 but applies its safety factor after the run cycle remaining adjustment done in process block 864. Note if the installer determines there is no need for a percentage factor PF, then PF can be entered as 1. In this case the expression (1−PF) becomes equal to zero, which makes the expression (RCD*(1−PF)) equal to zero, which effectively reduces the expression in block 870 to simply RCR <=0.

If the test in decision block 870 indicates the run cycle remaining is greater than zero and should not be ended, then the process is directed via 875 back to process block 858 to wait for updated predictions for available power, use period remaining and forecast errors. The process then continues as described previously to block 860 and 864 for making appropriate adjustments to run cycle remaining and then back to block 868 and decision block 870. Once the test in decision block 870 indicates the run cycle should end, the process is directed via 873 to process block 880 where the run cycle is stopped.

Figure 16:
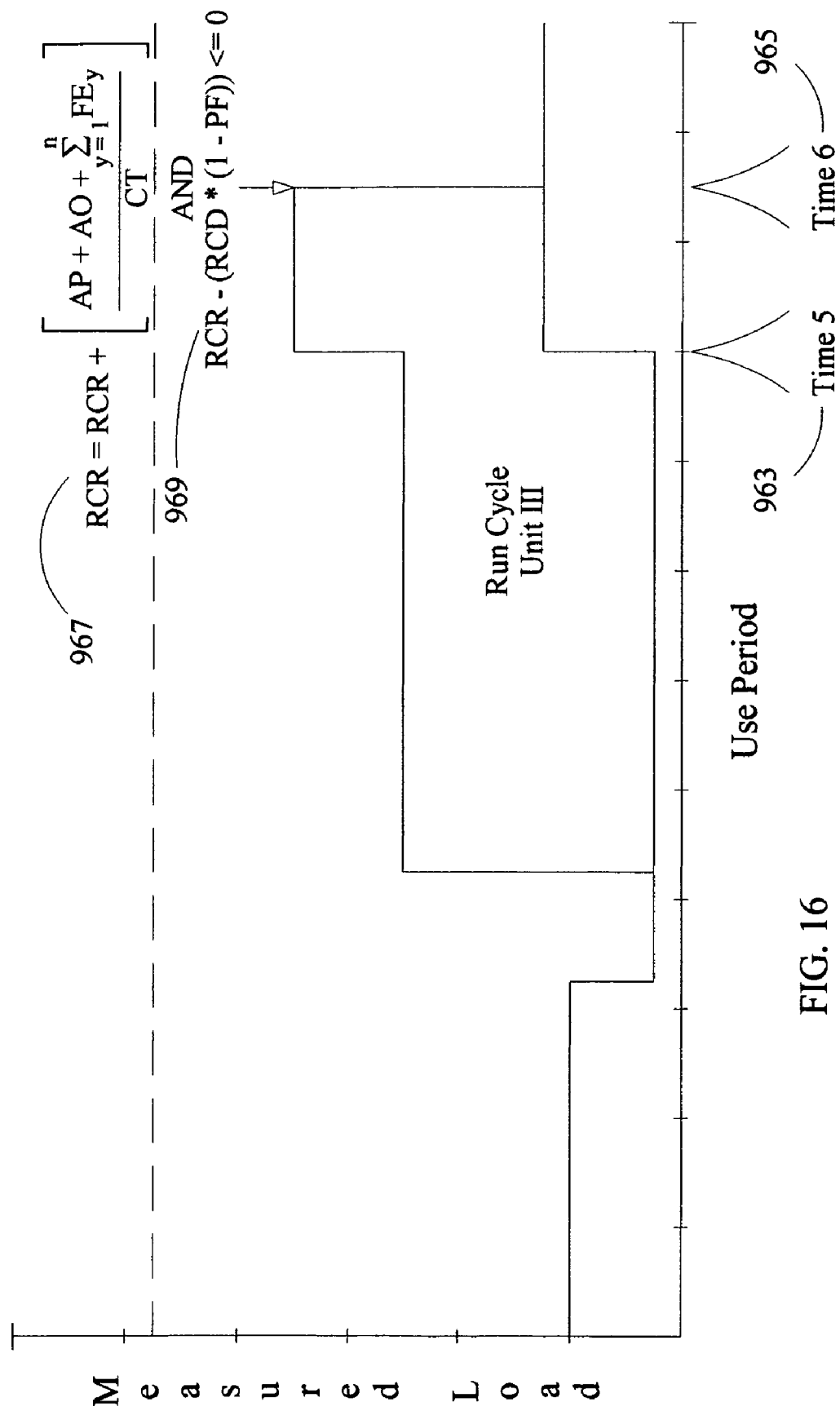
Figure 17:
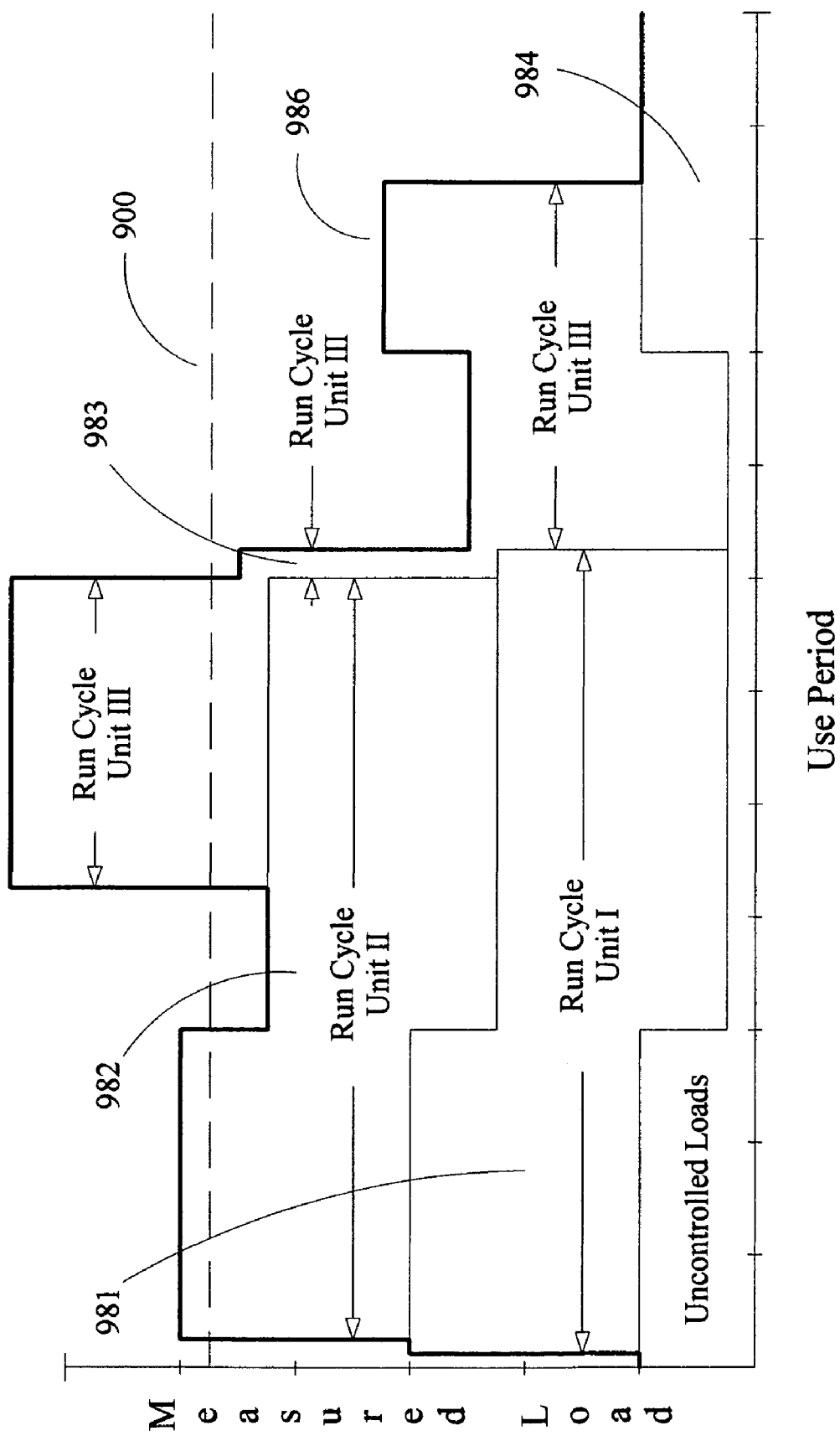

FIG. 16 provides a graphic example of the calculation in process block 864 and decision block 870 of FIG. 5 for an example of a preferred embodiment of the invention. At Time 5, item 963, the uncontrolled loads have increased. This change in load will be detected by the power monitor, which will adjust available power predictions accordingly. This change in available power prediction will cause the equation of item 967 to adjust the run cycle remaining RCR such that it reduces the run cycle sufficiently to compensate for the change in predicted available power. This calculation in item 967 is from process block 864 of FIG. 5. Item 969 calculates the adjustment for the device controller's percentage factor PF. The calculation in item 969 is from decision block 870. At Time 6, item 965, the condition for item 969 is satisfied and the run cycle of Unit III is stopped, which prevents the increase in uncontrolled load at Time 5 from causing usage to exceed the allocation.

From process block 880 the process continues to block 884 to wait the extended period. For an implementation of the invention where the percentage factor is set equal to one or nearly equal to one, there will be essentially zero available power at the end of the use period. In this case the extended wait period will serve little function. However in an implementation where the installer intended to use the percentage factor PF, and/or the factor Y, to leave a portion of the allocation as a safety margin against exceeding the allocation due to increases in background loads near the end of the use period, these factors in conjunction with the test in decision block 826, can be used to help prevent the device controller from starting a short run cycle that could use up some of the safety margin reserved for afore mentioned increases in background loads. It is also an option to change the process in block 884 such that the device controller waits for the beginning of the next use period before calculating and initiating another run cycle.

Once the use period has ended and the process has returned to block 810, the cycle is ready to repeat with the next use period and next allocation. The explanation above has covered all the processes and decision blocks with the exception of those addressing the authorized override AO. In the first cycle of the device controller after the system is initiated, the value of AO in process block 820 will probably be zero. The user could choose to preset an authorization override and create the mathematical equivalent of changing the allocation. However, it is assumed that the user would change the allocation if a long-term change were needed and reserve the authorization override as a method for short-term adjustments in energy usage when the user deems it necessary. With an authorization override of zero at the beginning of the use period, the device controller determines in process block 820 the duration of the run cycle allowed. This run cycle duration RCD will be passed via 823 to process block 830 for use in any information display offered to the customer. Process block 830 can use any of the values or parameters transmitted from the power monitor, other device controllers along with any values and parameters known to the device controller to report a status to the user in a format that is meaningful for the purpose of the supported device. Process block 830 could offer the customer the ability to make adjustments to the system along with the ability to adjust the allocation with an authorized override. Authorization overrides could also be presented with the cost of these overrides. This process block would use the rate structure to evaluate these costs and in turn the specific processes for any application would be dependent of the nature of the rate structure. The number of possible processes for block 830 is as numerous as the many possibilities for rate structure design. Whatever the design of the rate structure, the processes in block 830 should be designed to interpret the rate structure and present the user with clear, relevant options for using more power and overriding the allocation. It is conceivable that suppliers during times of high demand may offer customers lower rates, rebates or credits for using less power during a time of peak demand. In these circumstances, process block 830 would also present these opportunities for cost savings to the customer.

The process continues to decision block 830 where the customer will decide whether or not they will initiate an override. If no authorization is made then decision block 836 directs the process to block 840 where the value of AO is set equal to zero. Process block 840 then sends the value of the authorized override AO via 843 and 845 to process blocks 820 and 864 respectively. If the customer chooses to initiate an override, either an increase or decrease, the process continues via 837 to process block 846 where the customer inputs the level of override. A conversion may take place in block 846 whereby the user enters a cycle time change, or other change value relative to the purpose of the supported device, which will then be converted into a change in power. The user may also enter a change in power directly, in which case there would be no need for a conversion. Block 846 then sends an appropriate value of authorization override AO via 847 and 849 to process blocks 820 and 864 respectively. The value of authorized override may also be transmitted to other device controllers in the system. The process then continues from blocks 820 and 864 as previously described. The device controller can be configured to require an authorization override for each use period, for the duration of a current conservation period, or for any number of subsequent use periods.

FIG. 17 provides a graphical presentation of the combined run cycles of Units I, II, and III, as described in FIGS. 10 thru 16 for the example of the preferred embodiment of the invention. Units I and II have device controllers executing the processes of FIGS. 4 and 4A, causing their loads to run towards the beginning of the use period. Unit III has a device controller executing the processes of FIG. 5, causing the load to run towards the end of the use period. The area under the collective load curves, shown with the heavy line, item 986, represents the total energy usage of the facility, which includes the three controlled units and the uncontrolled loads. The area under load curve, item 986 is equivalent to the area under the dotted line, item 900, representing the allocation at constant load.

A common application of the invention will be facilities with central air conditioning and heat pump systems. For some commercial versions of these systems, the compressors are designed to run at variable speeds depending on the level of cooling or heating needed by the facility. Some of these compressors are designed to run continuously and to idle at low speeds when cooling or heating is not needed. For these systems, having the invention shut off a compressor, could cause damage to the compressor. For these applications, the device's continuous load CT will be the increase in load from the idling load, to a load identified by the installer or the manufacturer of the air conditioning or heat pump system. This identified load level would be at the discretion of the installer or manufacturer, but is anticipated to be one that optimizes the cooling or heating performance, vs. a load level that produces maximum cooling or heating. When the invention was executing its processes to maintain energy usage at or below the allocation, the run cycles would be calculated based on the load level identified by the installer or manufacturer, and during a run cycle, the air conditioning or heat pump system would be run at the identified load level.

The descriptions of FIGS. 4 & 4A and in FIG. 5 show how the device controllers will influence the load patterns of the loads they control. If the uncontrolled electric demand of a facility is greater than the allocation, then the device controllers will restrict the run time of their corresponding loads, causing the control systems native to the loads to take all the run time the device controllers will allow. Under these conditions the load patterns will be fairly repetitive. If the total electric demand of all loads in the facility is less than the allocation then the load patterns will be somewhat less repetitive, given the control systems native to the loads will not always turn their loads on when the device controllers allow a run cycle and may turn off their loads before the device controllers end their respective run cycles. For some applications it may be desirable to maintain repetitive load patterns in which case the system would be activated during these times in spite of the fact the actual usage was below the allocation. To maintain repetitive load patterns, the system could have allocations set for each time interval with the intention that the allocation would be just below the uncontrolled usage. This would cause the run cycles of the devices to operate in repetitive load patterns. Repetitive load patterns could be used in conjunction with staggered time intervals to create a lower aggregate load for a plurality of facilities.

For any installation, the choice of device controllers for any implementation is left up to the customer. These device controller choices can be either those of FIGS. 4 and 4A or those of FIG. 5. Those device controllers running the processes of FIGS. 4 and 4A would implement their run cycles during the beginning of the use period and those device controllers running the processes of FIG. 5 would implement their run cycles towards the end of the use period. The invention also includes option of including a delay to the start of a run cycle in FIGS. 3 and 4A. This delay would be a value input by the installer or customer for the purpose of allowing run cycle starts to occur at some set point in the use period. Device controllers using the processes of FIG. 5 could be adjusted to start their run cycles early by simply setting a value of Y in decision block 850 to a value greater than 100%. These adjustments could be used to stagger the starts of devices throughout the use period. This allows the installer to essentially distribute and sequence the supported loads throughout the use period by way of the type of device controller used on each device, and the sequence numbers, percentage factors and Y values set on the respective device controllers. All combinations of power monitors and device controllers are included in the invention.

Device Controller Calibration

Figure 6:
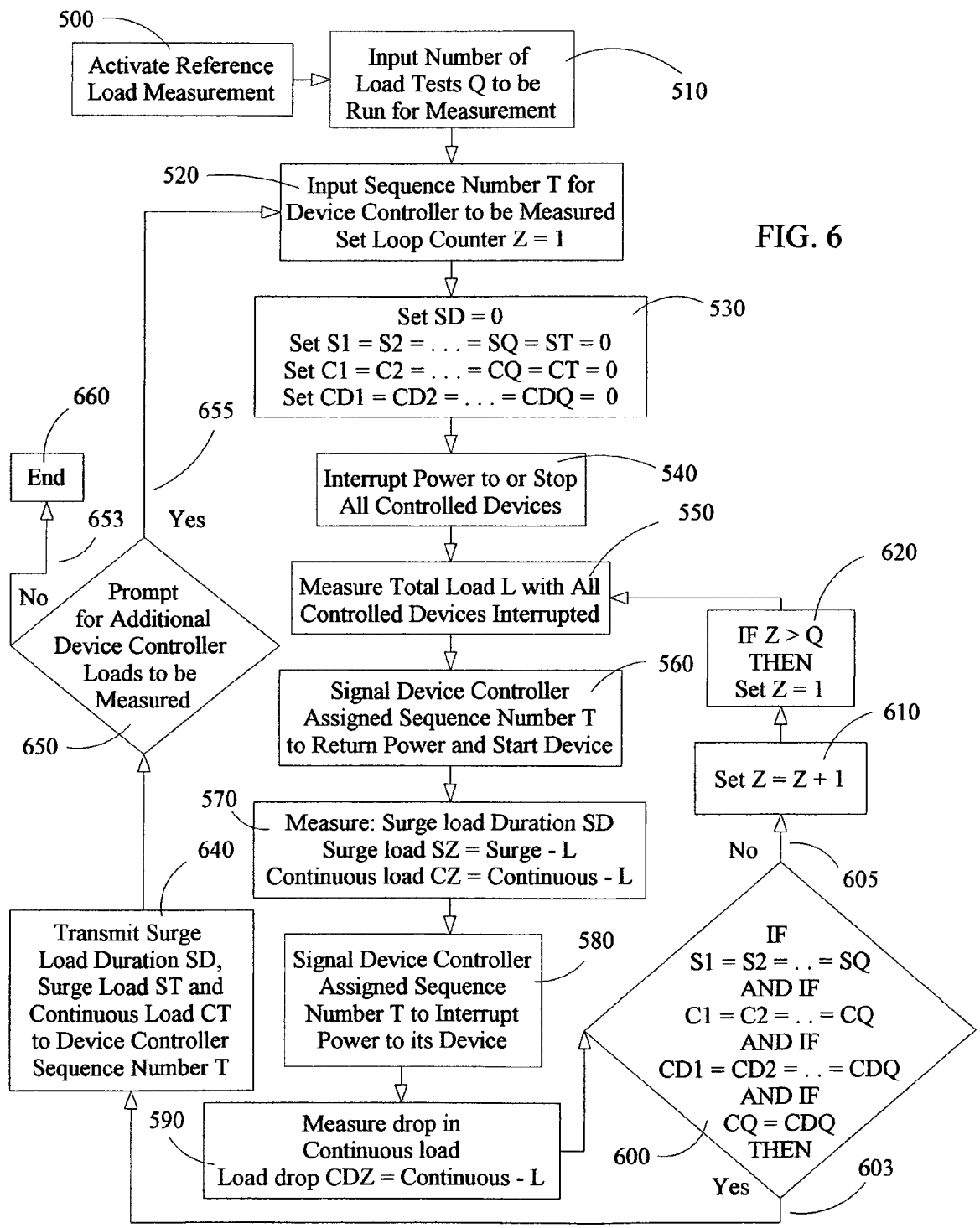
FIG. 6 is a flow diagram for the processes used to measure the surge and continuous loads of the supported device with the measuring capability of the power monitor and then transferring these load values to the device controllers for storage and use in the distributed decision methods, in accordance with the present invention.

Device controllers can be systems installed in the power line supplying power to a device, they can be methods that integrated into the control system of a device or they can be methods integrated into remote control systems for the device. For some of these implementations of the invention it may be efficient to use the load measuring capabilities of power monitor to measure the surge and continuous loads of the supported device. These implementations can be configurations were it is preferable to install the methods of the device controller in a way that does not provide easy access to the device's power line. Using this method for determining surge and continuous load could also reduce cost by eliminating the load measuring capability from the device controller. For the calibration process, the device controller should be able to initiate a run cycle, or the supported device should be adjusted such that it will initiate a run cycle every time the device controller allows. Once the calibration process is complete the values of surge and continuous load, measured by the power monitor, are communicated to the device controller, stored, and used by the device controller's distributed decision process during normal system operation. These methods are detailed in FIG. 6. These methods are also applicable to U.S. Utility patent application Ser. No. 09/877,809—"Methods and Apparatus for Controlling Electric Appliances During Reduced Power Conditions" in that the load measuring capabilities of the generator monitor can be used to measure the surge and continuous loads of the devices supported by the interrupt switches. Although the methods of the generator monitor are different from the power monitor and the methods of the interrupt switch are different from the device controllers, the requirements for known surge and continuous loads are similar. Therefore the methods for determining the surge and continuous loads are applicable in both inventions. In the discussion of FIG. 6 the reference to the power monitor and the device controller are intended to include the generator monitor and the interrupt switch respectively, of U.S. Utility patent application Ser. No. 09/877,809.

FIG. 6 details the methods for using the load measuring capabilities of the power monitor to measure the surge and continuous loads of a supported device and transmit these values to the device controller for use in its decision processes. The methods described in FIG. 6 can be integrated in either the power monitor or the device controller, or potentially in a separate system that can communicate with both power monitor and device controller. The calibration starts with process block 500 which will stop normal operation of the system and start the calibration process. The process continues to block 510 where the user specifies the number of load tests Q. The invention acknowledges that other loads in the facility may turn on or off during the calibration causing discrepancies between the loads measured by the power monitor and the loads created by the devices supported by the device controllers. The calibration process will repeat the measurements until a consistent measurement is obtained Q times. The process continues to block 520 where the user is prompted for the device controller sequence number T for which the calibration will be performed. Process block 520 also sets a loop counter Z equal to 1. This loop counter is used to stop the process after the loop measures the values consistently Q times. This loop will be discussed again later with the description of process block 620. The process continues to block 530 where zero values are set for the duration of the surge load SD, surge loads S1 thru SQ, continuous loads C1, thru CQ and the values of load drop for CD1 thru CDQ. The values of surge load ST and continuous load CT, which are stored in device controller sequence number T, are also set to zero. It is acknowledged that the duration of the surge load SD could easily be measured T times as are the surge and continuous loads, ST, CT and CDQ. This would create an equation for SD equivalent to those for ST, CT and CDQ in block 530 along with similar changes in decision block 600 and 640 to be explained later in this description. However it is noted that after getting consistent readings for ST, CT and CDQ, it is very unlikely that the last measured value of surge load duration would be inaccurate. For this reason it is assumed that the value of surge load duration SD can be measured in each pass of the loop with only the last value being stored for calibration. Continuing to process block 540, all device controllers are instructed to either interrupt power to, or stop the device they support. Moving on to process block 550 the power monitor measures the load L on its circuit(s), which represents the load of the uncontrolled devices, running in the facility. Process block 550 begins a loop that seeks repetitive values for surge and continuous loads. The process continues to block 560 where the device controller with sequence number T is instructed to return power and/or start its device. Once the device has been instructed to start in block 560, the process continues to block 570 where the power monitor measures the surge load duration, the surge load and the continuous load applied to its circuit(s). In block 570, the measured surge minus the total load L from block 550 is the surge load SZ for the device. The measured continuous load minus the total load L measured in block 550 is the continuous load CZ for the device. Recalling the process is in a loop and that the variable Z was given a value of 1 in block 520, the first time through the loop, the value of surge SZ will be S1 and the first continuous value CZ will be C1. The process moves on to block 580 where the device controller with sequence number T, is instructed to stop its load. This will cause a drop in the total load L, which is also assumed to be the continuous load of the device supported by device controller T. The process then moves to block 590 where this load drop CDZ is calculated as the measured load just prior to block 580 minus the total load L on circuits. The process then moves on to decision block 600 where multiple values of surge and continuous loads are compared as the loop accumulates values for surge and continuous loads. In this first pass through the loop, the variables S1 and C1 have been given values in the previous block 570. The remaining values S2 . . . SQ and C2 . . . CQ have values of zero which were set in process block 530. Therefore in the first execution of the loop the equality tests (S1=S2= . . . =SQ and C1=C2= . . . =CQ) fail causing the decision block to direct the process via 605 to process block 610. In process block 610 the loop counter Z is incremented by one in the equation Set Z=Z+1. The process continues to block 620 where the loop counter Z is checked. If the loop has executed more than Q times as set in process block 510, the loop counter Z is set back to 1. This condition would occur if the loop had executed Z times and decision block 580 had not found all measured surge loads SZ to be sufficiently equal, and all continuous loads CZ and load drops CDZ, to be sufficiently equal. The failing of the check in decision block 600 after measuring Z surge and Z continuous loads would indicate that another uncontrolled device had started or stopped during the calibration and caused an inaccurate value of surge or continuous load to be measured. By setting Z back to 1 the loop will replace the values for SZ and CZ at a rate of once per loop, until the inaccurate value of a surge or continuous load is replaced with an accurate value. The process is then directed back to block 550 to repeat the loop. The loop will continue through 550, 560, 570, 580, 590 and 600 where the values of surge and continuous load will again be compared with (IF S1=S2= . . . =SQ AND IF C1=C2= . . . =CQ AND IF CD1=CD2= . . . =CDQ AND IF CQ=CDQ). This loop will continue until all the calculated values for S1 to SQ are equal and all values C1 to CQ and CD1 to CDQ are equal. It is acknowledged that the accuracy of the meter in the power monitor to measure changes in load may inhibit the systems ability to measure exactly equal loads for S1 thru SQ, C1 thru CQ and CD1 thru CDQ. Therefore it is left to the system designer to take into account the level of accuracy of the components being used and to determine a tolerance band for sufficiently equal values for the tests in decision block 600. Once the calculated values of surge and continuous loads pass the equivalency test in block 600, the process is directed via 603 to block 640. In block 640 the values for surge duration, surge load and continuous load are transmitted to the device controller with sequence number T, to be stored and referenced in the device controller's future decision making. At this point, the system has successfully calibrated one device controller with the surge and continuous loads as measured by the power monitor. The process then moves on to decision block 650 where the customer can choose to calibrate another device controller, or end the process. If the customer chooses to calibrate another device controller then decision block 650 directs the process via 655 to block 520 where the calibration repeats for another device controller. If the customer does not choose to calibrate another device controller, then decision block 650 directs the process via 653 to 660 where the calibration process ends.

Figure 7:
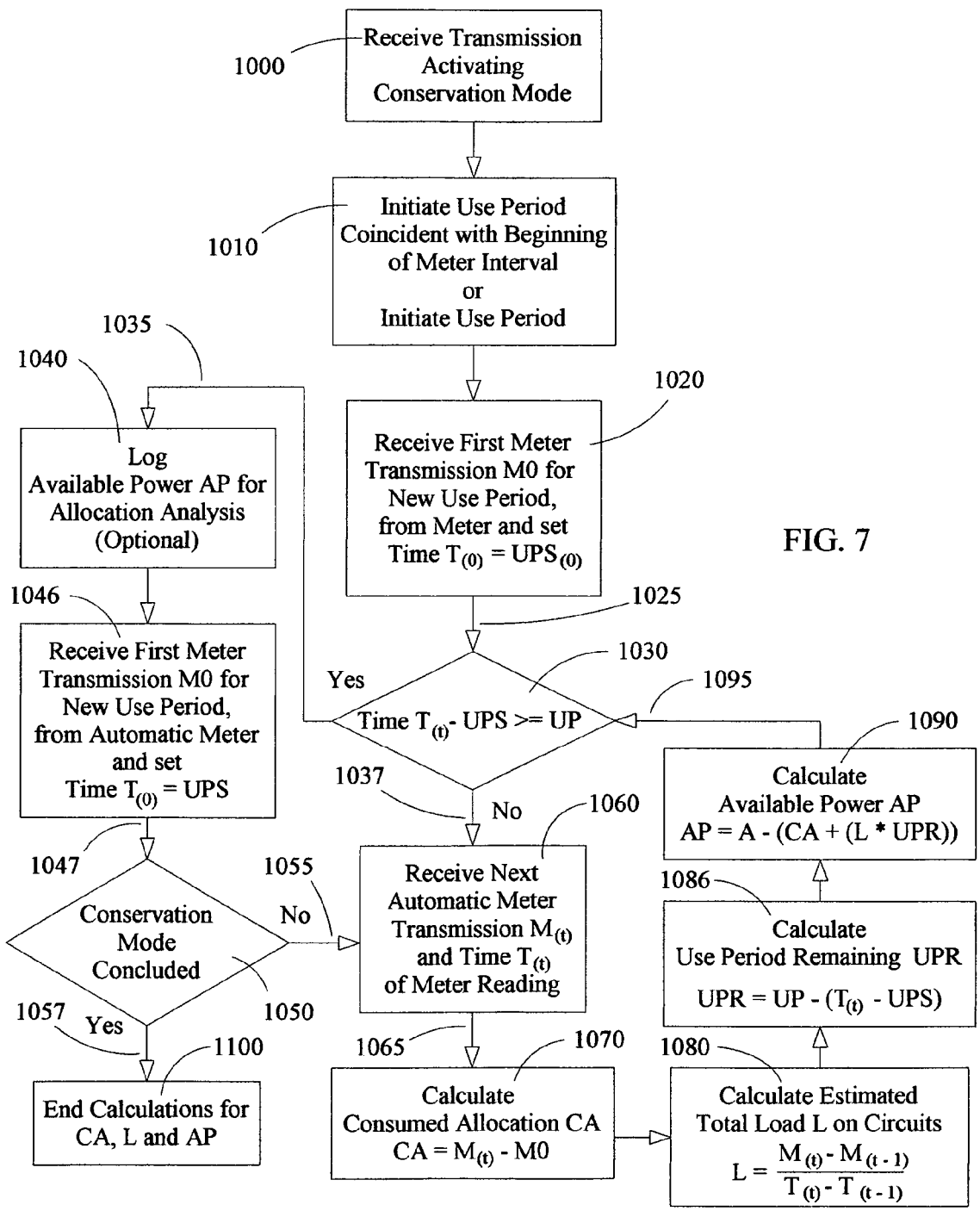
FIG. 7 is a flow diagram of a device controller's processes for determining available power from periodic usage readings, in accordance with the present invention.

FIG. 7 provides the processes for a device controller to derive a history of power consumption from a meter that provides sequential meter readings that are sufficiently frequent so as to achieve the desired level of accuracy for a given installation. In other embodiments of the invention, the power monitor measures the consumed allocation and momentary load, and uses these values to calculate the available power values throughout the use period. The total load and consumed allocation are used in process block 1090 of FIG. 7 to calculate available power similarly to the way the power monitor would calculate the available power in process block 166 of FIG. 3. In this configuration, synchronization between the electric meter's time interval and the device controller's use period would also benefit the accuracy of the system. Incorporating these methods in the device controller(s) could allow for the economic use of some interval meters. The more frequently the meter transmits meter readings, the more accurate the values of estimated load and available power. There is also the possibility that if meter readings are transmitted too frequently, the changes in background loads and the effects of surge loads on the measurement of total load L on circuits and the resulting usage forecasts, could generate an unnecessary number of adjustments in run cycle duration RCD and run cycle change RCX. This would not adversely affect the operation of the system but in highly functional systems with comprehensive reporting capabilities, these unnecessary adjustments might create unnecessary noise in the reporting of system status. It is also possible that the cost of computational components would be higher for systems that derive the history of power consumption from an interval meter that produces meter readings too frequently. Therefore the reference to adjusting the meters to transmit readings at "sufficiently frequent time intervals" is intended to give the invention the flexibility necessary to achieve the desired level of accuracy, performance and system cost for the intended application. The actual frequency of meter reading transmissions is left to the designer or installer of the system.

In process block 1000 of FIG. 7 the Device Controller receives an activation instruction that initiates a conservation mode. The system could also run continuously if the application warranted maintaining electricity usage within the assigned allocation on an ongoing basis. In an application where the system is intended to run continuously, process block 1000 could be eliminated or used as an on/off control at the installation. The system continues to process block 1010 where the system initiates a use period. The use period should either be equal to the meter's interval or the use period should be a multiple of the meter's interval. If the system is to coordinate its use period with the beginning of the interval meter's time intervals, then the interval meter should have the capability to transmit or communicate to the device controller, when it begins its time interval. It is also possible to have an installer or an external system, either synchronize or simultaneously initiate the meter's time interval with the device controller's use period. The system in process block 1010 will initiate its use period synchronized with the meter. If the application of the system does not offer any desirable benefit from coordinating the beginning of the meter's time interval with the beginning of the use period, then the system can simply initiate the use period independently. The system continues to process block 1020 where the device controller receives the first meter reading and stores this meter reading as M0 or usage reading at time $T_{(0)}$. Time $T_{(0)}$ is intended to be coincident with the beginning of each use period. If the conservation mode is initiated in the middle of a use period, then an adjustment can be made based on the data tracked prior to the initiation of the conservation mode, such that the first meter reading in the next use period is stored as time $T_{(0)}$. Also, whenever the conservation mode is initiated in the middle of the use period, there is the option of shutting the controlled load off until the beginning of the next use period. The process continues to decision block 1030 where it enters a loop that determines consumed allocation CA, estimated total load L and available power AP.

In decision block 1030 the system enters a loop. The test in block 1030 is whether or not the current use period is finished. If the use period is not finished, decision block 1030 directs the process via 1037 to process block 1060 where the device controller waits for and receives the next meter reading transmission $M_{(t)}$. Process block 1060 will also record the time $T_{(t)}$ of this meter reading where the subscript t is a sequential reading indicator. The time $T_{(t)}$ can be obtained either from the device controller's clock or as a transmission from the automatic meter transmitting the meter reading. The process then proceeds via 1065 to block 1070. In block 1070 the consumed allocation CA is calculated by subtracting the meter reading M0, recorded at the start of the use period UPS from the most recent meter reading $M_{(t)}$ received via block 1060. The difference in these meter readings is the amount of allocation energy consumed during the use period or consumed allocation CA.

The process proceeds to block 1080 where estimated total load L is calculated. The total load L on circuits is estimated by taking the difference between the most recent meter readings $M_{(t)}-M_{(t-1)}$ and dividing by the difference in time between the meter readings $T_{(t)}-T_{(t-1)}$. This is essentially a calculation of power consumed over a period of time. The more frequent the meter readings, the more accurate the estimate of total load L on circuits. It is conceivable that very frequent meter transmissions may add an unnecessary level of accuracy and cost for high-speed communication and processing equipment. Therefore, if an application has a meter that transmits too frequently, the device controller may be designed to receive meter readings at fixed intervals. In one embodiment of this invention, if the intended system accuracy were satisfied with meter readings every two seconds, and the meter used in the application transmitted ten readings a second, then the device controller could be designed to take every twentieth meter reading and reading time, thereby modifying the reading frequency to the desired two second intervals. In this embodiment of the invention, the expressions $M_{(t)}-M_{(t-1)}$ and $T_{(t)}-T_{(t-1)}$ would become $M_{(t)}-M_{(t-20)}$ and $T_{(t)}-T_{(t-20)}$ respectively. Cycle counter in the device controller would perform the calculation at proper intervals.

From block 1080 the process then continues to block 1086 where the use period remaining UPR is calculated. Use period remaining UPR is calculated by calculating the difference of the most recent $T_{(t)}$ minus the use period start UPS and then subtracting this difference from the length of the full use period UP. After calculating the use period remaining UPR the process continues to block 1090 where the values CA, L, and UPR, calculated in blocks 1070, 1080 and 1086 respectively are used to calculate the available power AP. The forecast energy usage for the use period is calculated by assuming the estimated total load L on circuits will continue for the remainder of the use period in the expression (L*UPR). This forecast for the remainder of the use period is then added to the consumed allocation in the expression (CA+(L*UPR)). This consumed allocation plus the forecast is then subtracted from the full allocation A in the expression A−(CA+(L*UPR)) resulting in the value of available power AP. The values of available power AP and use period remaining UPR, as calculated by the device controller in FIG. 7 can then be substituted for the values of the available power AP and use period remaining UPR, otherwise calculated and transmitted by the power monitor (FIG. 3), in the processes of the device controller in FIGS. 4, 4A and 5.

The process in FIG. 7 then proceeds from block 1090 back to decision block 1030, which tests to see if the current use period has ended. If the use period UP has not ended, then the process continues in the loop via 1037 to continue calculating updated values of use period remaining and available power AP. If the use period remaining has ended, or is about to end momentarily, then decision block 1030 directs the process via 1035 to process block 1040 where the value of available power AP at the end of the use period can be optionally logged for analysis. This logging of available power, both positive and negative, at the end of each use period can be used for numerous evaluations and/or trend analysis. These evaluations could be used to indicate the appropriateness of the chosen allocation, or as an indicator that some of the loads in the facility may not be operating as expected. The process of FIG. 7 then continues to block 1046 where a new use period is initiated. In process block 1046 the next meter transmission at the beginning of the use period is received and recorded as meter reading zero M0 and the time $T_{(0)}$ is set for use period start UPS. The process continues to decision block 1050 where a check is made to see if the conservation mode has concluded. There are numerous methods for ending the conservation mode such as a signal from a supplier, at a predetermined time, at the end of a given time period, after a set number of use periods, etc. Whatever method or format is intended for determining the end of a conservation period; the chosen method will be evaluated and acted upon in decision processes of block 1050. If decision block 1050 determines that the conservation mode has not ended then the process is directed via 1055 into the previously described loop at process block 1060. When entering the loop at process block 1060, the values of M0 and $T_{(0)}$ determined in process block 1046 are used in the next cycle of the loop. If decision block 1050 determines the conservation mode has concluded then the process is directed to block 1100 where the process ends and then waits for the next conservation mode to be activated at which time process block 1000 will respond and initiate the system again for the next conservation period. With the methods in FIG. 7 the values of use period remaining and available power can be calculated and tracked by the device controller instead of the power monitor.

The invention also includes the integration of the processes for determining whether sufficient power is available over the remainder of the time interval for operating a device for a run cycle of the device based on the available power prediction, into the power monitor, or a separate control unit. The processes of the device controller could be reduced to reporting to the power monitor, or control unit, whether or not its device was running and then either interrupting or returning power to the device at the command of the power monitor. The power monitor would support the user interface for system set up and control. The installer would select either the control processes of FIGS. 4 and 4A or of FIG. 5 for each device being controlled. During system operation, the device controller would transmit a load status to the power monitor indication whether or not the load was running. Device controllers would also receive commands from the power monitor to either interrupt or return power to the supported device. The user could input the device surge and continuous loads at the power monitor or the device controllers could have load-measuring capability to measure and communicate these values back to the power monitor. These values of surge and continuous load would then be stored and used by the power monitor, or control unit, to execute the chosen processes for the corresponding device.

The invention also includes methods for using the load measuring capability to measure the load of the supported device as described in FIG. 6. To measure the load of the device with the power monitor, there needs to be a process to turn the supported load on and off. The device controller could be designed with the capability to turn the load on and off for the purpose of calibration, or the installer could affect the parameters of the device such that the control system native to the device would turn the device on each time the device controller returned power during the calibration process. For an embodiment of the invention where a device controller was supporting a hot water heater, the installer could turn on a hot water faucet and let it run until the hot water heater turned on and then keep the faucet running for the duration of the calibration. For this condition, the hot water heater would run each time the device controller returned power. For another embodiment of the invention where a device controller was supporting an air conditioning compressor, the installer could turn the air conditioning thermostat to a sufficiently low temperature such that the air conditioning compressor would turn on each time the device controller returned power. For these and other implementations of the invention the calibration process would have the power monitor instruct the device controller to turn the device on and off, as described in FIG. 6, until the measured changes in load repeated sufficiently to determine the surge and continuous loads of the device. The power monitor would then store these surge and continuous loads for each device controller and use them in the decision processes during normal system operation.

Some power monitors, or electric meters with the methods of the power monitor integrated into them, may not measure the facilities usage frequently enough to make the determination of surge loads effective. In some embodiments of the invention, the meter readings may be taken on the order of once or twice a minute, which is significantly longer than the duration of a surge load lasting a few seconds or less. Therefore, in applications where the power monitors or automatic meters, determine available power with meter readings taken at intervals that are significantly longer than the duration of a surge load, it may be desirable to eliminate the use of surge loads in the calculation of run cycle duration RCD. This would eliminate the use of the variables surge load duration SD and surge load ST in the equations of process blocks 380 of FIGS. 4 and 820 of FIG. 5. In such applications, the accuracy of the process would be more in line with the accuracy of the components used to construct the invention.

A customer can evaluate a preferable allocation for a given facility by reviewing the available power logged at the end of each use period. For this evaluation the invention could be run for a reasonable period of time with a relatively high allocation level. With a high enough allocation level the device controllers would not limit the run cycles of their devices. A tracking of the end of use period allocation values can then be used to calculate an appropriate allocation level. By evaluating the positive available power values at end of use periods (average amount, mean value, smallest amount, etc.) and subtracting from the high allocation level, a more reasonable allocation level can be derived for normal operation. To determine a conservation level that reduces energy usage by a desired amount or percentage, the desired reduction should be taken off the allocation derived for normal operation. These allocation levels could then be used as needed for normal and conservation periods.

In one embodiment of the invention, a home with a central air conditioning system, an electric hot water heater and a pool with pool pump, wishes to reduce energy usage during a demand response event as defined by the local Independent System Operator. The proper allocation however is unknown. The homeowner installs standard timers on the electric hot water heater and pool pump to prevent them from operating in the afternoon hours when demand response events are likely to be initiated. The homeowner has an electric meter installed with the methods of the power monitor integrated into the meter. The homeowner also installs a thermostat with the integrated methods of the device controller. The homeowner runs the calibration process described in FIG. 6 so that the thermostat can learn the load of the air conditioning compressor. The homeowner then decides to run a baseline for the next month with a very high 8000 watt-hr allocation per one-hour use period. After the baseline period ends the homeowner finds there were two demand response events initiated by the local Independent System Operator during the baseline. Evaluation of the log of available power at the end of the use periods during the demand response events determines that effectively 3000 watt-hrs of the 8000 watt-hr allocation was not used during the demand response events. Subtracting the 3000 watt-hrs of available power from the 8000 watt-hr allocation, leads the homeowner to determine that the home's unrestrained usage is about 5000 watt-hrs per hour during a demand response event. The homeowner decides to set the normal allocation at 5000 watt-hrs. The homeowner may then decide that they want to reduce usage by 20% during the conservation mode and sets the allocation at 20% less than 5000 watt-hrs per hour for an allocation of 4000 watt-hrs per hour during conservation. With this setting, whenever a conservation mode is activated the home's energy use will be held to an hourly usage of 4000 watt-hrs.

Figure 8:
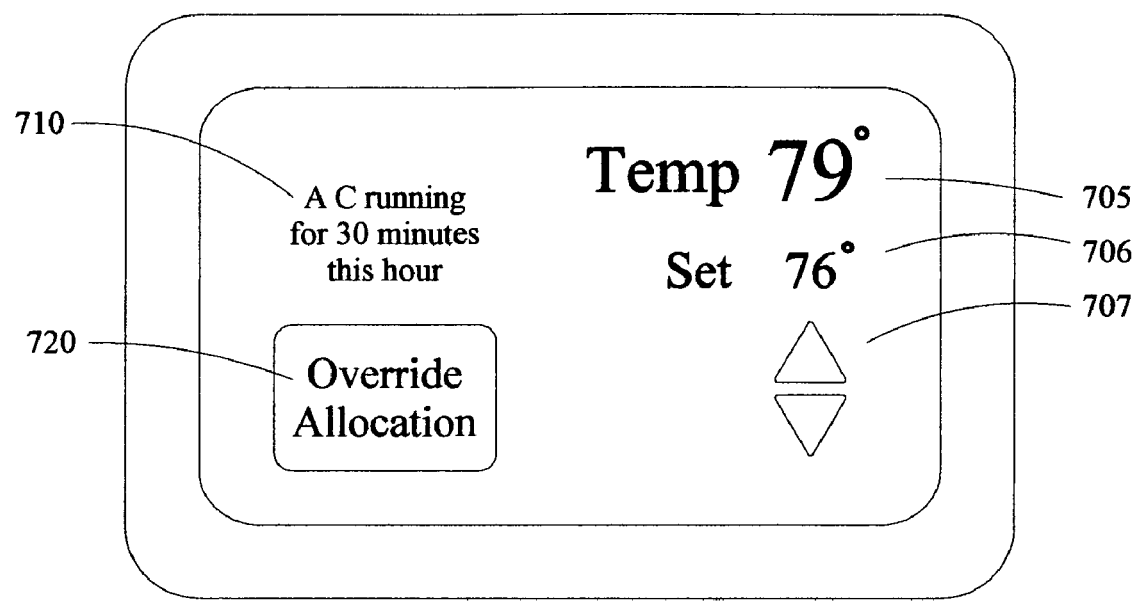
FIG. 8 is a view of a thermostat display in accordance with the present invention.
Figure 8A:
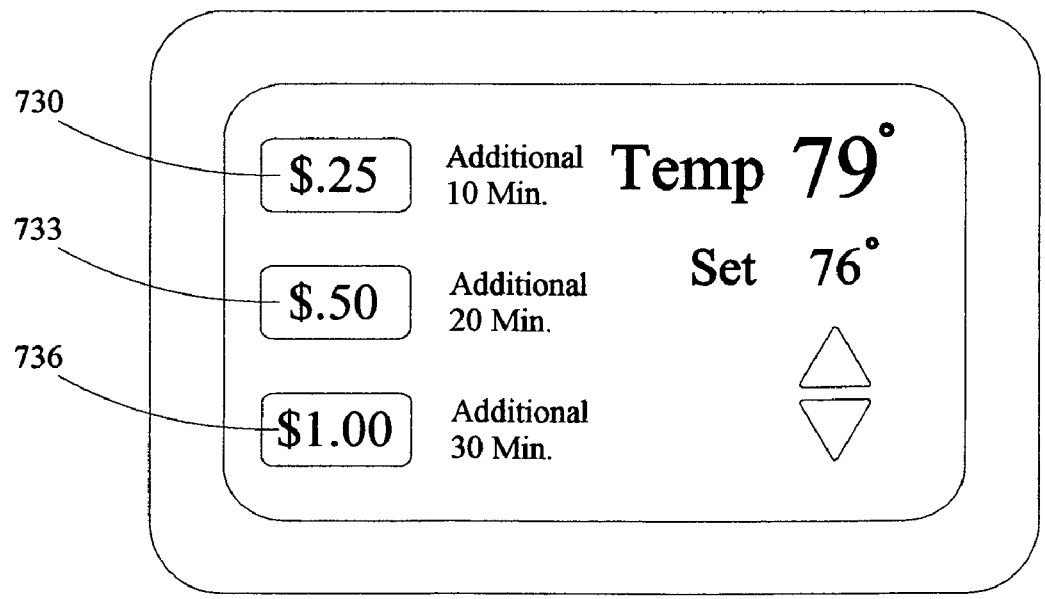
FIG. 8A is a second view of a thermostat display, in accordance with the present invention.

FIGS. 8 and 8A show an embodiment of the invention where by some of the methods of the device controller and some of the methods of a central air conditioning thermostat are integrated into one display. In FIG. 8, items 705, 706 and 707 are common in most thermostats, including the current temperature, the set temperature and buttons for changing the set temperature up and down respectively. Item 710 is a report generated by block 450 in FIG. 4A. Item 710 has used the run cycle duration RCD and run cycle change RCX along with any adjustments necessary between the system's use period and the reported time frame of "this hour", to report the length of time the air conditioning system is expected to run this hour. Item 720 shows a button that allows the customer to request override options. After pressing the Override Allocation button 720 in FIG. 8 the display changes and offers the options presented in FIG. 8A. These offerings are air conditioning for an additional 10 minutes at a cost of $0.25 (item 730), an additional 20 minutes for a cost of $0.50 (item 733) and an additional 30 minutes for an additional cost of $1.00 (item 736). By pressing any of these buttons on the display, the user would be authorizing an override that would support the additional noted air conditioning time. The override allocation would be acknowledged in decision block 460 and would then be converted into an amount of power for the value of authorized override AO in block 470 of FIG. 4A for use in block 420 and 430. The override offerings in FIG. 8A are just an example of the type of information that can be presented to the customer. Actual implementations of the invention would utilize the parameters and values relevant to the installation and present a dynamic status that reflects the facilities current use of power and override options, based on the methods of the invention. The options for status reporting and overrides are many and the nature of the presentation from process block 450 in FIG. 4A will vary with the type of device controlled, its application and the parameters under which the home or facility obtains it energy.

FIG. 9 shows one embodiment of the invention for a residential application. This residence is assumed to be on a time of use electric rate whereby the electric rate is higher during on peak hours, which are summer weekday afternoons, and lower during off peak hours, which are all other hours of the year. Independent of the timing of peak and off peak, the meter is capable of determining when on peak and off peak hours are in effect. Given the higher cost of on peak electricity, the customer decides to conserve energy with a low allocation during on peak hours. The residence pictured in FIG. 9 is a two-story house with two central air conditioning compressors 754, one of which sends refrigerant to an air circulator in the basement for cooling the first floor and a second compressor that sends refrigerant to an air circulator in the attic to cool the second floor. Device controllers for the central air conditioning compressors consist of device controller methods integrated into the air conditioning thermostats (not shown) located inside the residence. The residence has the power monitor methods integrated into the electric meter 750. The available power AP is transmitted to the device controllers in the residence via a wireless signal 752. The residence also has an electric hot water heater 756 and a commonly available timer that is set to provide electricity only during off peak hours. The home also has a washer and dryer in the basement 760. The residence also has solar energy panels mounted on the roof 762. During on peak hours, the homeowner wishes to limit their energy usage from the supplier to just one kilowatt-hour every hour. This usage does not include the energy produced by the solar panels. The power monitor therefore will calculate a dynamic allocation during each use period. The power monitor will calculate the allocation to be one kilowatt-hour from the supplier plus the energy coming from the solar panels. It is known that solar panels produce differing levels of energy depending on the angle of the suns rays hitting the panel. Sun light of an given intensity, produces more electricity when it hits the panel directly perpendicular to the panels surface, and less electricity as the sun light comes in at an angle to the surface. The amount of power provided through the use period could be used to reduce the consumed allocation CA in block 130 of FIG. 3 and the current flow of electricity could be used to reduce the measured total load L in process block 140. Alternately the solar panel could calculate and transmit to the power monitor the amount of energy that it will be able to deliver during the next use period. If the solar panel system includes some form of electric storage, then the solar panel system can take into account accordingly the state of charge when it calculates its projection of the power it will be able to deliver during the next use period.

As noted the residence in FIG. 9 also has an electric hot water heater on a commonly available timer, and a washer and dryer that are without any control device to manage their operation. In this configuration, if either the timer on the hot water heater fails to stop operation during on peak hours (events such as power failures could cause the timers clock to be incorrect allowing operation during on peak hours) or if the user decides to run the washer and then the dryer during on peak hours, the respective loads of these devices will increase the background load which will decrease available power AP. This will cause the device controller methods integrated into the thermostats, to reduce the duration of the air conditioning compressors run cycle to compensate for the energy used by either the hot water heater or the washer and dryer. This action will prevent the residence from exceeding the set allocation, but will also cause the home to become warmer due to the reduction in air conditioning. If the home becomes warm enough such that the user notices the increase in temperature, the user will most likely approach one of the thermostats. The thermostats can be programmed to detect changes in the available power relative to previous time periods. If for instance the average run time during on peak hours is 30 minutes and suddenly the available power transmissions are such that the run time for a given use period is only 20 minutes, the device controller can report this as a general condition such as background loads high. With this report, if the homeowner were to input into the device controller a list of uncontrolled devices and/or devices on commonly available timers then the device controller could report this list back whenever it detects a condition where run cycle times are shorter than normal. The device controller could provide a simple report of—background loads high. Check timer on hot water heater. Are the following appliances running? Washer-Dryer-.... The device controller would simply be reporting a condition followed by the list of possible causes that were entered when installed.

Figure 10:
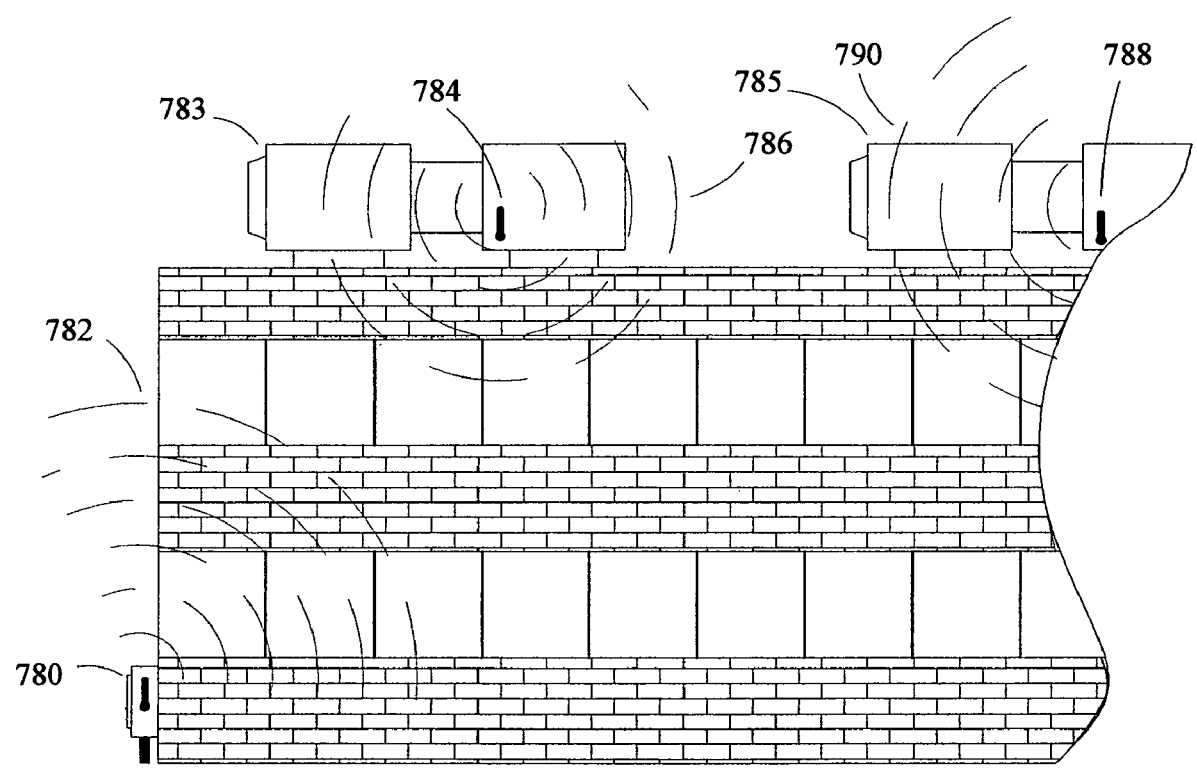
FIG. 10 is a drawing of a commercial office building in which an embodiment of the invention is installed.

FIG. 10 shows one embodiment of the invention in an application for a commercial office building. The office building is a two-story facility with two central air conditioning units 783 and 785 on the roof In this application it is assumed that the customer wants to maintain usage within a reasonable allocation for each of the summer months and to participate in load reduction during demand response events called by an entity such as the supplier, the local Independent System Operator (ISO) or Regional Transmission Operator (RTO). The customer chooses to review hourly energy usage in past years to determine an allocation for each of the summer months. The customer could use any number of methods to determine an allocation such as calculating the monthly average peak usage from past years, or choosing an allocation that is slightly less than the highest monthly peak usage during a multiyear period. The customer will then determine a lower allocation for demand response events that will keep the temperature in the building at a tolerable level. Any anticipated reduction in usage due to curtailment actions, such as turning off lighting and equipment during these demand response events, could also be taken into account when determining this lower allocation level for the demand response events. The allocations for each month for both normal operation and for demand response events will be entered into the power monitor. In this embodiment of the invention the power monitor methods are integrated into an interval meter 780. These allocation levels could be input via a communication medium such as radio wave or an Internet connection, or could be input directly via a keypad or touch screen display connected to the power monitor.

The power monitor 780 will transmit available power AP and use period remaining UPR via radio waves 782 to the device controllers 784 and 788 on the roof top air conditioning units 783 and 785. The device controllers in this application will intercept the control signals from thermostats in the facility to the air conditioning units. This allows the facility to have multiple thermostats controlling multiple zones on one air conditioning unit, with just one device controller at the air conditioning unit. The device controller will effectively override the thermostat and prevent the air conditioning unit from running outside of the allowable run cycle time. The device controllers 784 and 788 will transmit forecast errors back and forth via radio waves 786 and 790. The customer has also chosen device controller methods of FIGS. 4 and 4A to control air conditioning unit 783 and device controller methods of FIG. 5 to control air conditioning unit 785. This choice will cause unit 783 to run towards the beginning of the use period and unit 785 to run towards the end of the use period. For this embodiment of the invention the air conditioning unit 783 cools one third of the space in the office building and the unit 785 cools the other two thirds. The customer decides to direct one third of the available power to unit 783 and two thirds of the available power to unit 785. To allocate the available power as the customer intends, the percentage factor PF for the device controller 783 will be set at 33% and the percentage factor PF for device controller 785 will be set at 100%. Note, since the device controller supporting air conditioning unit 783 will allow the run cycle towards the beginning of the use period, it will calculate a run cycle time RCT that will consume 33% of the available power. The device controller supporting air conditioning unit 785 and using the processes of FIG. 5, will allow the run cycle towards the end of the use period, and will calculate a run cycle duration based on an available power from which the device controller for air conditioning unit 783 will have already taken roughly 33% of the available power. Therefore 100% of the available power, and forecast error, received by the device controller supporting air conditioning unit 785, at the time it starts its run cycle, will be roughly 66% of the available power transmitted at the beginning of the use period. It is acknowledged that changes in background loads may affect the final division of available power between device controllers. In most applications the affects of dynamic background loads should not be significant enough to create noticeable or otherwise unacceptable differences in the division of available power between device controllers.

In FIG. 10 a load reduction for a demand response event can be initiated by simply contacting the power monitor, which in this embodiment of the invention is integrated into the meter. Many current day electric meters have communications capability via radio wave or via the Internet. Many current day interval electric meters are connected to the Internet for the purpose of reporting real time usage data back to suppliers. Independent of the communication method, simply contacting the meter and signaling the power monitor that the lower allocation should be used in the systems processes, is all that is necessary to initiate the load reduction. Once the allocation is changed in the power monitor, the rest of the system responds accordingly. Contacting the meter again and instructing it to set the allocation back to the previous or normal level can trigger the end of the demand response event.

Device controllers can be used on or with virtually any device that can have its run cycle adjusted. The descriptions frequently refer to applications for air conditioning but are not in any way limited to these devices. A home located in a relatively cool area with a small air conditioning system, a large heated outdoor pool and a Jacuzzi, may find it more effective to put device controllers on the pumps and heaters for the pool and Jacuzzi, and allow the small central air conditioning system to run uncontrolled. The better application of the invention's methods is to implement device controllers on the dominant or larger power consuming loads in a home or facility that have variable run cycles. This allows the total energy usage of the facility to be contained with a minimum of components.

I claim:

1. An electric power management system that manages a distribution of available power at an installation comprising:
    a power source monitor that monitors an allocation of power of a power source over a time interval, the power source monitor predicting an available power at an installation over a remainder of the time interval in response to the power allocation and in response to a history of power consumption of the installation since a start of the time interval to generate an available power prediction for the installation for the remainder of the time interval; and
    at least one device controller that receives the available power prediction from the power source monitor to determine whether a sufficient power is available over a remainder of the time interval for operating a corresponding device for a run cycle of the device.

2. The electric power management system according to claim 1, wherein the installation is a residential facility or a commercial facility.

3. The electric power management system according to claim 1, wherein the power source monitor transmits the available power prediction to the at least one device controller.

4. The electric power management system according to claim 1, wherein the power source monitor comprises multiple power source monitors, each of the multiple power source monitors having at least one corresponding device controller.

5. The electric power management system according to claim 1, wherein the power source monitor predicts the available power at the installation over the remainder of the time interval by comparing the history of power consumption of the installation since the start of the time interval and the allocation of the available power over the time interval.

6. The electric power management system according to claim 1, wherein the device controller stores electric load characteristics of the corresponding device.

7. The electric power management system according to claim 6, wherein the device controller receives the electric load characteristics by monitoring a power line that supplies the corresponding device.

8. The electric power management system according to claim 6, wherein the device controller receives the electric load characteristics from one of an installer or manufacturer of the device.

9. The electric power management system according to claim 6, wherein the device controller uses the electric load characteristics and the available power prediction to determine a duration of the run cycle of the corresponding device.

10. The electric power management system according to claim 1, wherein the at least one device controller comprises multiple device controllers, each device controller associated with a corresponding device.

11. The electric power management system according to claim 10, wherein each device controller of the multiple device controllers determines whether a sufficient power is available for operating the corresponding device for a run cycle of the device.

12. The electric power management system according to claim 1, wherein the at least one device controller operates the run cycle of the corresponding device using a thermostat.

13. The electric power management system according to claim 1, wherein the device comprises a heat pump or air conditioning unit.

14. The electric power management system according to claim 1 further comprising a meter that provides the history of power consumption of the installation to the power source monitor.

15. A method of managing a distribution of available electric power at an installation comprising:
    monitoring an allocation of electric power of a power source over a time interval;
    predicting an available power at the installation over a remainder of the time interval in response to the electric power allocation and in response to a history of power consumption of the installation since a start of the time interval to generate an available power prediction for the installation for the remainder of the time interval; and determining whether sufficient power is available over a remainder of the time interval for operating a device for a run cycle of the device based on the available power prediction.

16. The method of managing the distribution of electric power of claim 15, wherein predicting the available power at the installation over the remainder of the time interval comprises comparing the history of power consumption of the installation since the start of the time interval and the allocation of the available power over the time interval.

17. The method of managing the distribution of electric power of claim 15 further comprising:

monitoring a power line that supplies electric power to the device to receive electric load characteristics of the device; and storing the electric load characteristics of the device.

18. The method of managing the distribution of electric power of claim 17 further comprising determining a duration of the run cycle of the device based on the electric load characteristics and the available power prediction.

19. The method of managing the distribution of electric power of claim 15 further comprising determining whether a sufficient power is available for operating multiple devices for corresponding run cycles of the devices.

20. The method of managing the distribution of electric power of claim 15, wherein the device comprises a heat pump or air conditioning unit.

* * * * *